(12) United States Patent
Kimino

(10) Patent No.: US 7,838,951 B2
(45) Date of Patent: Nov. 23, 2010

(54) SEMICONDUCTOR SENSOR AND MANUFACTURING METHOD OF THE SAME

(75) Inventor: Kazunari Kimino, Hyogo (JP)

(73) Assignee: Ricoh Company, Ltd., Tokyo (JP)

( * ) Notice: Subject to any disclaimer, the term of this patent is extended or adjusted under 35 U.S.C. 154(b) by 356 days.

(21) Appl. No.: 12/109,101

(22) Filed: Apr. 24, 2008

(65) Prior Publication Data
US 2008/0265346 A1 Oct. 30, 2008

(30) Foreign Application Priority Data
Apr. 25, 2007 (JP) ............... 2007-115735

(51) Int. Cl.
*H01L 29/78* (2006.01)
*H01L 21/00* (2006.01)
(52) U.S. Cl. .............. 257/414; 438/50; 338/277
(58) Field of Classification Search ................. 257/414, 257/415, 418; 438/50; 338/47, 227
See application file for complete search history.

(56) References Cited
U.S. PATENT DOCUMENTS
5,115,292 A * 5/1992 Takebe et al. ............... 257/415
5,549,785 A * 8/1996 Sakai et al. .................. 438/52
6,560,002 B2 * 5/2003 Mori .......................... 359/247
7,540,191 B2 * 6/2009 Hashimoto et al. ........ 73/514.29
7,626,263 B2 * 12/2009 Kim ............................ 257/737

FOREIGN PATENT DOCUMENTS
| JP | 2003-202778 | 9/1991 |
| JP | H03-202778 | 9/1991 |
| JP | 2003-270262 | 9/2003 |
| JP | 2006-250653 | 9/2006 |
| JP | 2007-033355 | 2/2007 |

* cited by examiner

*Primary Examiner*—W. David Coleman
(74) *Attorney, Agent, or Firm*—Dickstein Shapiro LLP

(57) ABSTRACT

A semiconductor sensor and a manufacturing method of the same capable of making the specific gravity of a weight part to be greater than that of a weight part made of semiconductor material only is disclosed. The semiconductor sensor includes the weight part, a supporting part, a flexible part, and plural piezoresistive elements. The weight part includes a weight part photosensitive resin layer made of photosensitive resin in which metal particles are included. The supporting part surrounds and is separated from the weight part. The flexible part is provided between the weight part and the supporting part to support the weight part. The flexible part includes a flexible part semiconductor layer where the plural piezoresistive elements are formed. This configuration allows the specific gravity of the weight part photosensitive resin layer greater than that of the weight part semiconductor layer due to the metal particles.

14 Claims, 15 Drawing Sheets

SEMICONDUCTOR SENSOR AND MANUFACTURING METHOD OF THE SAME

BACKGROUND OF THE INVENTION

1. Field of the Invention

The present invention generally relates to a semiconductor sensor using a piezoresistor such as a semiconductor acceleration sensor or a semiconductor angular velocity sensor and a manufacturing method of the same. More specifically, the present invention relates to a semiconductor sensor and a manufacturing method of the same in which the semiconductor sensor includes a weight part, a supporting part formed around and separated from the weight part, a flexible part connected between the weight part and the supporting part so as to support the weight part, a semiconductor layer made of semiconductor materials in at least one part of each of the weight part, the supporting part, and the flexible part, and plural piezoresistors formed in the semiconductor layer of the flexible part.

Such a semiconductor sensor, for example, is used for measuring acceleration of a moving vehicle in the vehicle longitudinal direction or in the vehicle width direction or degree of jiggling of a hand upon using a video camera.

It should be noted that the term "semiconductor substrate" described in the claims of the present invention and this specification includes not only a substrate made of only semiconductor materials but also an SOI (Silicon-on-Insulator) substrate including an insulating film formed therein.

2. Description of the Related Art

As a semiconductor sensor, an acceleration sensor used in a vehicle is known. For example, there is an acceleration detecting device using an piezoresistive device as shown in FIGS. 13A though 13D (see Japanese Patent No. H8-7228). As shown in FIGS. 13A though 13D, the acceleration detecting device is a flat and compact semiconductor sensor 71 having a size of approximately 3 mm by 2 mm. The semiconductor sensor 71 includes a weight part, a flexible part, and a supporting part. The weight part, the flexible part, and the supporting part are integrally formed by etching silicon using a potassium hydrate aqueous solution. In the flexible part of the acceleration detecting device, there is provided a piezoresistive device whose resistance is changed in accordance with the bending of the flexible part due to the displacement of the weight part caused by acceleration, thereby detecting the change of resistance of the piezoresistive device as the acceleration.

FIGS. 13A though 13D are a perspective view, a plan view, cross-sectional views taken along lines A-A' and B-B' of FIG. 13B, respectively, showing an example of a conventional semiconductor sensor 71.

As shown in FIGS. 13A though 13D, the semiconductor sensor 71 is formed using an SOI substrate including a first semiconductor layer 5, a second semiconductor layer 9, and an insulating layer 7 sandwiched between the first semiconductor layer 5 and the second semiconductor layer 9. From a different point of view, the semiconductor sensor 71 includes a frame-shaped supporting part 11 made of the SOI substrate 3, and flexible parts 73 each made of the first semiconductor layer 5 and connected to the supporting part 11. There are plural piezoresistive elements 19 formed in the first semiconductor layer 5 of the flexible part 73. In the center side of the supporting part 11, there is provided a weight part 75 surrounded by and separated from the supporting part 11. The weight part 75 includes the first semiconductor layer 5, the insulating layer 7, and the second semiconductor layer 9. The first semiconductor layer 5 of the weight part 75 is continuously formed with the first semiconductor layer 5 of the flexible part 73. Because of this structure, the weight part 75 is supported by the flexible part 75.

On a first surface 3a of the SOI substrate 3, an insulating film 21 is formed. In FIGS. 13A and 13B, the piezoresistive elements 19 are shown for illustrative purposes. On the insulating layer 21, plural metal wiring patterns 23 and plural pad electrodes 25 are formed. The metal wiring patterns 23 are electrically connected to the corresponding piezoresistive elements 19 via through holes formed in the insulating film 21.

A protection film 27 is formed on the insulating film 21 so as to cover not only the insulating film 21 but also areas where the metal wiring patterns 23 are formed on the insulating film 21. An opening is formed in the protection film 27 on each pad electrode 25. The protection film 27 is not shown in FIGS. 13A and 13B for illustrative purposes only.

A second surface 3b (opposite to the first surface 3a) of the supporting part 11 and a glass substrate 29 are bonded together by anodic bonding. As a result, the surface of the weight part 75 on the second surface 3b of the SOI substrate 3 side is separated from the glass substrate 29.

FIGS. 14A though 14F are cross-sectional views taken along line A-A' in FIG. 13B, illustrating steps of a manufacturing method of the semiconductor sensor 71. Each of the parenthetical numbers shown in FIGS. 14A through 14F corresponds to the step of the manufacturing method described below. Next, a manufacturing method of a conventional semiconductor sensor is briefly described with reference to FIGS. 13A through 14F.

Step (1): As shown in FIG. 14A, a thermal oxide film 69 is formed on the second surface 3b of the SOI substrate 3 including the first semiconductor layer 5, the insulating layer 7, and the second semiconductor layer 9. The piezoresistive elements 19 are formed in the vicinity of the surface of the first semiconductor layer 5 on the first surface 3a side of the SOI substrate 3. The insulating film 21 is formed on the first surface 3a of the first semiconductor layer 5. Through holes are formed at prescribed positions in the insulating film 21. The metal wiring patterns 23 and the pad electrodes 25 are formed on the area of the insulating film 21 including the areas where the through holes are formed (see FIG. 13C). A protection film 27 is formed on the surface of the insulating film 21. An opening (not shown) is formed in the protection film 27 and on each of the pad electrodes 25.

Step (2): As shown in FIG. 14B, by photoengraving and etching techniques, the thermal oxide film 69 on areas where the flexible parts 73 and the weight part 75 are to be formed excluding at least an area where the supporting part 11 is to be formed is selectively removed.

Step (3): As shown in FIG. 14C, by a photoengraving technique, the resist pattern 77 is formed on the second surface 3b of the SOI substrate 3 so that the resist pattern 77 covers the area where the supporting part 11 and the weight part 75 are to be formed and an opening is formed on the area where the flexible parts 73 are to be formed. Then, by an etching technique, the second semiconductor layer 9 on the area where the flexible parts 73 are to be formed is selectively removed by using the resist pattern 77 as a mask.

Step (4): As shown in FIG. 14D, after the resist pattern 77 is removed, the second semiconductor layer 9 on the second surface 3b side of the SOI substrate 3 in the area where the weight part 75 is to be formed is etched. Namely, the thickness of the second semiconductor layer 9 in the area where the weight part 75 is to be formed is reduced to form the weight part 75. A resist pattern (not shown) for defining the area where the flexible parts 73 and the weight part 75 are to be formed is formed on the second surface 3b side of the SOI substrate. By using the resist pattern, the insulating layer 7, the first semiconductor layer 5, insulating film 21, and the protection film 27 in the area other than the areas where the flexible parts 73 or the weight part 75 is to be formed inside the area where the supporting part 11 is to be formed are removed by an etching technique to form the flexible parts 73 and the weight part 75.

Step (5): As shown in FIG. 14E, the thermal oxide film 69 is removed. In this step, the insulating film 7 in the area where the flexible parts 73 are to be formed is also removed to form the flexible parts 73 made of the first semiconductor layer 5.

Step (6): As shown in FIG. 14F, a stopper substrate 29 and a surface of the second semiconductor layer 9 on the second surface 3b side of the SOI substrate 3 in area including the area where the supporting part 11 is to be formed are bonded together by, for example, anodic bonding.

Step (7): Finally, each of the semiconductor sensors 71 is cut off from the SOI substrate 3 to complete the manufacturing steps of the semiconductor sensor 71 (see FIGS. 13A through 13D).

In the description above, the semiconductor sensor 71 is formed using the SOI substrate 3 as a semiconductor substrate. However, the present invention is not limited to the semiconductor sensor formed from the SOI substrate. For example, the semiconductor sensor may be formed of a semiconductor substrate including semiconductor materials only (see Japanese Patent Application Publication No. 2003-270262).

Further, as disclosed in the Japanese Patent Application Publication No. 2003-270262, in the semiconductor sensor, there may be plural flexible parts formed so that each of the flexible parts connects between one of the surfaces of the weight part facing the supporting part in plan view and the supporting part (double holding type) or there may be a single flexible part connected between one surface of the weight part and the supporting part (single holding type).

Further, recently, there has been a growing demand for reducing the size and the thickness of chips. To respond to the demand, a semiconductor sensor having a weight part that is made of a metal material having a specific gravity greater than that of a semiconductor material is disclosed (see, for example, Japanese Patent Application Publication No. 2006-250653). By forming the weight part made of a material having a specific gravity greater than that of a semiconductor material, the weight of the weight part increases compared with a weight part made of silicon and having the same size as that of the weight part made of the metal material, thereby reducing the size and thickness and improving the sensitivity of the semiconductor sensor.

Still further, to increase the volume of the weight part, a semiconductor sensor including a weight part having a plan-view shape different from a rectangular shape such as a cloverleaf shape is disclosed (see for example, Japanese Patent Application Publication No. 2007-033355).

To improve the sensitivity of a semiconductor sensor in which the weight part, the flexible part, and the supporting part are integrally formed of silicon, there is a method for reducing the width or thickness, or increasing the length of the flexible part. However, in this method for improving the sensitivity, there may be a problem in that the mechanical strength of the beam part (flexible part) becomes not strong enough to withstand the stresses during the manufacturing process. As another method to improve the sensitivity, there is a method for increasing the weight of the weight part. However, it is necessary to increase the size of the weight part so as to increase the weight of the weight part, which goes against the demand for reducing the size of semiconductor sensors.

Further, unfortunately, in a semiconductor sensor including a weight part made of a metal material to have a specific gravity greater than that made of a semiconductor material, there is a problem in that such a weight part made of a metal material may not be formed in a typical manufacturing process of a semiconductor device, thereby causing an increase of the number of manufacturing steps and accordingly the manufacturing cost.

SUMMARY OF THE INVENTION

The present invention is made in light of the above problems, and may provide a semiconductor sensor capable of the weight of a weight part being increased compared with a weight part made of semiconductor materials without increasing the size of the weight part and a manufacturing method of the same.

According to an aspect of the present invention, there is provided an semiconductor sensor including a weight part, a supporting part, a flexible part, and plural piezoresistive elements. The weight part includes a weight part semiconductor layer made of a semiconductor material and a weight part photosensitive resin layer made of photosensitive resin in which metal particles are included. The supporting part surrounds and is separated from the weight part and includes a supporting part semiconductor layer made of a semiconductor material. The flexible part connects the weight part at one end of the flexible part and the supporting part at the other end of the flexible part so as to support the weight part. The flexible part includes a flexible part semiconductor layer made of a semiconductor material. The plural piezoresistive elements are formed in the flexible part semiconductor layer. Because of this feature, the specific gravity of the weight part photosensitive resin layer becomes greater than that of the weight part semiconductor layer due to the metal particles included in the weight part photosensitive resin layer.

According to another aspect of the present invention, there is provided a method of manufacturing the semiconductor sensor according an embodiment of the present invention. The manufacturing method includes the steps of:

step (A): forming a photosensitive resin layer by coating photosensitive resin including metal particles on a second surface side of a semiconductor substrate opposite to a first surface side of the semiconductor substrate on which the piezoresistive elements are formed;

step (B): forming the weight part photosensitive resin layer in an area where the weight part is to be formed by patterning the photosensitive resin layer through the processes including exposing, developing, and cleaning processes; and step (C): forming the weight part semiconductor layer, the flexible part semiconductor layer, and the supporting part by executing steps including etching the semiconductor substrate from the second surface side of the semiconductor substrate to a predetermined depth in an area at least other than an area where the weight part and the supporting part are to be formed, and etching the semiconductor substrate from the first surface side of the semiconductor substrate to a predetermined depth in an area at least other than the area where any of the weight part, the flexible part, and the supporting part is to be formed.

In a semiconductor sensor and a method of manufacturing the same according to an embodiment of the present invention, the diameter of the metal particles is less than the thickness of the weight part photosensitive resin layer and is, for example, in a range between several nm and several tens of μm. Further, the content rate of the metal particles is in a range, for example, between 5 and 47.5 volume percent in a not-yet-hardened state and between 10 and 95 volume percent in a hardened state of the weight part photosensitive resin layer so that the specific gravity of the weight part photosensitive resin layer becomes greater than that of the semiconductor layer and a photoengraving process can be performed on not-yet-hardened photosensitive polyimide resin to form a weight part photosensitive resin layer.

Further, the photosensitive resin may be polyimide resin. However, the photosensitive resin is not limited to polyimide resin. For example, other photosensitive resin such as epoxy resin, acrylate resin, urethane resin, polyester resin, or polyolefin resin may be used.

Still further, the metal of the metal particles may be any of iridium, silver, and bismuth. However, the metal of the metal particles is not limited to iridium, silver, and bismuth. For example, other metals such as gold, platinum, tungsten, nickel, or tantalum may be used as the metal of the metal particles.

In a semiconductor sensor according to an embodiment of the present invention, the supporting part further includes a supporting part photosensitive resin layer having substantially the same thickness and the same material as those of the weight part photosensitive resin layer so that the thickness of the entire weight part becomes substantially the same as that of the entire supporting part.

Further, each of the weight part, the supporting part, and the flexible part may be formed by processing an SOI substrate including, from a surface side of the semiconductor sensor, a first semiconductor layer, an insulating layer, and a second semiconductor layer. The flexible part includes the first semiconductor layer and each of the weight part and the supporting part includes the first semiconductor layer, the insulating layer, and the second semiconductor layer. The weight part photosensitive resin layer is formed on the second semiconductor layer of the weight part.

In a method of manufacturing a semiconductor sensor according to an embodiment of the present invention, in the step (A), before forming the photosensitive resin layer, the thickness of the weight part semiconductor layer may be reduced to less than that of the supporting part so that the thickness of the semiconductor substrate in the area where the weight part is to be formed is less than that in the area where the supporting part is to be formed, by etching the semiconductor substrate from the second surface side of the semiconductor substrate in a prescribed area to a prescribed depth.

In this case, in step (A), an insulating film pattern may be formed on the second surface of the semiconductor substrate in the area where the supporting part is to be formed. The insulating film pattern serving as a mask when the semiconductor substrate in the prescribed area may be etched from the second surface side of the semiconductor substrate. This insulating film pattern may be left after the semiconductor substrate in the prescribed area is etched from the second surface side of the semiconductor substrate to the prescribed depth. The photosensitive resin layer may be formed on the insulating film pattern as well. In addition, in step (c), when the semiconductor substrate is etched from the second surface side of the semiconductor substrate, the weight part photosensitive resin layer and the insulating film pattern may serve as masks.

Further, in step (B), when the photosensitive resin layer is patterned, in the area where the supporting part is to be formed, a supporting part photosensitive resin layer may be formed from the photosensitive resin layer.

In this case, in step (C), when the semiconductor substrate is etched from the second surface side of the semiconductor substrate, the weight part photosensitive resin layer and the supporting part photosensitive resin layer may serve as masks.

Still further, in step (C), a step may be included of forming a resist pattern on the second surface side of the semiconductor substrate, the resist pattern covering at least areas where the weight part and the supporting part are to be formed, and the resist pattern may serve as a mask when the semiconductor substrate is etched from the second surface side of the semiconductor substrate.

Still further, an SOI substrate may be used as the semiconductor substrate. The SOI substrate includes, from the first surface side of the SOI substrate, a first semiconductor layer, an insulating layer, and a second semiconductor layer laminated together. Further, in step (C), when the semiconductor layer is etched from the second surface side of the semiconductor substrate, the insulating layer may serve as an etching stopper layer.

The features and advantages of the present invention are further described in the following description.

In a semiconductor sensor according to an embodiment of the present invention, the weight part includes the weight part semiconductor layer having a semiconductor layer and the weight part photosensitive resin layer made of photosensitive resin in which metal particles are included. Because of this configuration, the specific gravity of the weight part photosensitive resin layer becomes greater than that of the weight part semiconductor layer due to the metal particles.

Further, in a method of manufacturing the semiconductor sensor according to an embodiment of the present invention, the method includes the steps of: step (A): forming a photosensitive resin layer by coating photosensitive resin including metal particles on a second surface side of a semiconductor substrate opposite to a first surface side of the semiconductor substrate on which the piezoresistive elements are formed; step (B): forming the weight part photosensitive resin layer in an area where the weight part is to be formed by patterning the photosensitive resin layer through the processes including exposing, developing, and cleaning processes; and step (C): forming the weight part semiconductor layer, the flexible part semiconductor layer, and the supporting part by executing steps including etching the semiconductor substrate from the second surface side of the semiconductor substrate to a predetermined depth in the area at least other than the area where any of the weight part and the supporting part is to be formed, and etching the semiconductor substrate from the first surface side of the semiconductor substrate to a predetermined depth in an area at least other than an area where any of the weight part, the flexible part, and the supporting part is to be formed.

Advantageously, in the semiconductor sensor as manufactured above, the weight part includes the weight part semiconductor layer and the weight part photosensitive resin layer made of photosensitive polyimide resin whose specific gravity is greater than that of the weight part semiconductor layer. Because of this structure, it becomes possible to increase the weight of the weight part compared with a weight part having the same size as that of the weight part and made of semiconductor materials only, thereby enabling reducing the size and the thickness and improving the sensitivity of the semiconductor sensor.

Further, the weight part photosensitive resin layer can be formed by the photoengraving technique (coating, exposing, developing, and cleaning processes of a resin layer) known as a general manufacturing process of a semiconductor device. Because of this feature, the weight of the weight part can be increased compared with a weight part having the same size as that of the weight part made of semiconductor materials only. Still further, the photoengraving technique can be used for forming the weight part photosensitive resin layer. Because of this feature, the weight part photosensitive resin layer can be formed with high accuracy.

Still further, advantageously, polyimide resin may be used as the photosensitive resin to form the weight part photosensitive resin layer and the supporting part photosensitive resin layer. Polyimide resin has excellent properties of heat resistance, moisture resistance and mechanical strength compared with the other photosensitive resins, thereby enabling improving the reliability of the weight part photosensitive resin layer and eventually the semiconductor sensor.

Still further, advantageously, iridium may be used as the metal of the metal particles included in the weight part photosensitive resin layer. Iridium has two to seven times the specific gravity of the other metals typically used in a semiconductor device manufacturing process such as aluminum, copper, or titanium. Because of this feature, the specific gravity of the weight part photosensitive resin layer including the iridium particles is increased more than that including particles of the other metals. In addition, iridium is a stable metal and has high heat resistance and high corrosion resistance. Therefore, when iridium is used as the metal of the metal particles included in the weight part photosensitive resin layer, the reliability of the weight part photosensitive resin layer and ultimately the reliability of the semiconductor sensor is improved. On the other hand, although the specific gravity of silver or bismuth is not so great as that of iridium, the cost of silver or bismuth is lower than that of iridium. Therefore, the manufacturing cost of semiconductor sensors using silver or bismuth can be reduced compared with that using iridium.

Still further, in a semiconductor sensor according to an embodiment of the present invention, the supporting part may include the supporting part photosensitive resin layer having substantially the same thickness of that of the weight part photosensitive resin layer and made of the same material as the weight part photosensitive resin layer. By doing this, it becomes possible to make the thickness of the entire weight part be substantially equal to that of the entire supporting part. As a result, it becomes possible to accurately control the size of the gap between the weight part and the stopper substrate to be bonded to the rear surface of the supporting part. In addition, the thickness of the supporting part photosensitive resin layer is substantially the same as that of the weight part photosensitive resin layer, and the material used in the supporting part photosensitive resin layer is the same as that used in the weight part photosensitive resin layer. Therefore, the supporting part photosensitive resin layer and the weight part photosensitive resin layer can be formed in the same single photoengraving process.

In a method of manufacturing the semiconductor sensor according to an embodiment of the present invention, in the step (A), before forming the photosensitive resin layer, a step may be included so the thickness of the weight part semiconductor layer is reduced to less than that of the supporting part so that the thickness of the semiconductor substrate in the area where the weight part is to be formed is less than that in the area where the supporting part is to be formed, by etching the semiconductor substrate from the second surface side of the semiconductor substrate in a prescribed area to a prescribed depth. By including this step, the thickness of the weight part semiconductor layer can be less than that of the supporting part. Further, by adjusting the thickness of the weight part semiconductor layer, the thickness of the entire weight part including the weight part photosensitive resin layer can be arranged so as to be substantially equal to or less than that of the supporting part.

Further in the manufacturing method including the above step of making the thickness of the weight part semiconductor layer less than that of the supporting part, in step (A), an insulating film pattern may be formed on the second surface of the semiconductor substrate in the area where the supporting part is to be formed so that the insulating film pattern serves as a mask when the semiconductor substrate in the prescribed area is etched from the second surface side of the semiconductor substrate. Then, the insulating film pattern is retained after the semiconductor substrate in the prescribed area is etched from the second surface side of the semiconductor substrate to the prescribed depth. The photosensitive resin layer is formed on the insulating film pattern as well. In addition, in step (c), when the semiconductor substrate is etched from the second surface side of the semiconductor substrate, the weight part photosensitive resin layer and the insulating film pattern can serve as masks. By doing this, it is not necessary to form a mask separately, thereby facilitating the manufacturing process of the semiconductor sensor.

Still further, in step (B), when the photosensitive resin layer is patterned, in the area where the supporting part is to be formed, a supporting part photosensitive resin layer may be formed from the photosensitive resin layer. By doing this, as described above, when the thickness of the weight part semiconductor layer is made less than that of the supporting part, it becomes possible to make the thickness of the entire weight part less than that of the entire supporting part and create an appropriate gap between the weight part and a flat stopper substrate without disposing a spacer between the supporting part and the stopper substrate to be bonded to the rear surface of the supporting part. On the other hand, when the step of making the thickness of the weight part semiconductor layer less than that of the supporting part is not included, the thickness of the entire weight part can be substantially equal to that of the entire supporting part by forming the supporting part photosensitive resin layer in the supporting part. The thickness of the supporting part photosensitive resin layer is substantially the same of that of the weight part photosensitive resin layer. Further, the supporting part photosensitive resin layer made of the same material as the weight part photosensitive resin layer. By doing this, the size of the gap between the weight part and the stopper substrate bonded to the rear surface of the supporting part can be accurately controlled. In addition, the supporting part photosensitive resin layer and the weight part photosensitive resin layer are formed simultaneously in a single photoengraving process. Therefore, the number of steps in the manufacturing process does not increase.

Still further, in a case where the supporting part photosensitive resin layer is formed, in step (C), when the semiconductor substrate is etched from the second surface side of the semiconductor substrate, the weight part photosensitive resin layer and the supporting part photosensitive resin layer may be used as masks. By doing this, it is not necessary to form a mask separately in step (C), thereby facilitating the manufacturing process of the semiconductor sensor.

Still further, in step (C), a step may be included of forming a resist pattern on the second surface side of the semiconductor substrate. The resist pattern covers at least the areas where any of the weight part and the supporting part is to be formed. As a result, the resist pattern can be used as a mask when the semiconductor substrate is etched from the second surface side of the semiconductor substrate. By doing this, the reduction of the volume of the weight part photosensitive resin layer due to the erosion during etching can be prevented. Further, variation of the volume of the weight part photosensitive resin layer due to the fluctuation of the etching time can also be prevented. In addition, when the supporting part photosensitive resin layer is formed, the erosion of the supporting part photosensitive resin layer can further be prevented.

In a semiconductor sensor according to an embodiment of the present invention, the weight part, the supporting part, and the flexible part may be processed from an SOI substrate including, from the first surface side of the SOI substrate, a first semiconductor layer, an insulating layer, and a second semiconductor layer laminated together. In this case, the flexible part includes the first semiconductor layer, and each of the weight part and the supporting part includes the first semiconductor layer, the insulating layer, and the second semiconductor layer. The weight part photosensitive resin layer is formed on the second semiconductor layer of the weight part.

Further, in a method of manufacturing the semiconductor sensor according to the embodiment of the present invention, the SOI substrate may be used as the semiconductor substrate. The SOI substrate includes, from the first surface side of the SOI substrate, the first semiconductor layer, the insulating layer, and the second semiconductor layer laminated together. Still further in step (C), when the semiconductor layer is etched from the second surface side of the semiconductor substrate, the insulating layer may be used as an etching stopper layer. By doing this, when the etching is performed from the rear side of the SOI substrate, the etching depth can be better controlled.

BRIEF DESCRIPTION OF THE DRAWINGS

Other objects, features, and advantages of the present invention will become more apparent from the following description when read in conjunction with the accompanying drawings, in which.

DETAILED DESCRIPTION OF THE PREFERRED EMBODIMENTS

Figure 1A:
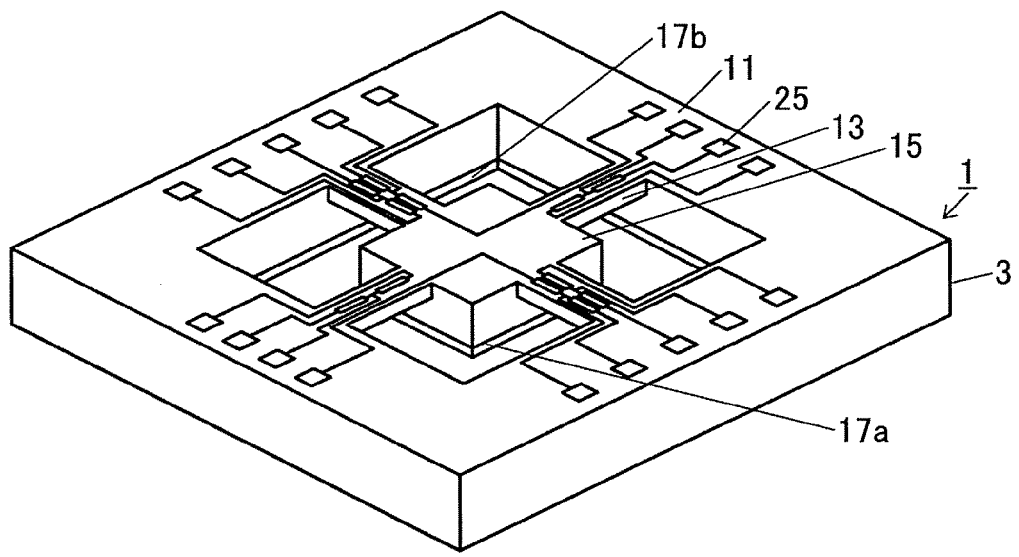
FIG. 1A is a perspective view showing a semiconductor sensor according to an embodiment of the present invention.
Figure 1B:
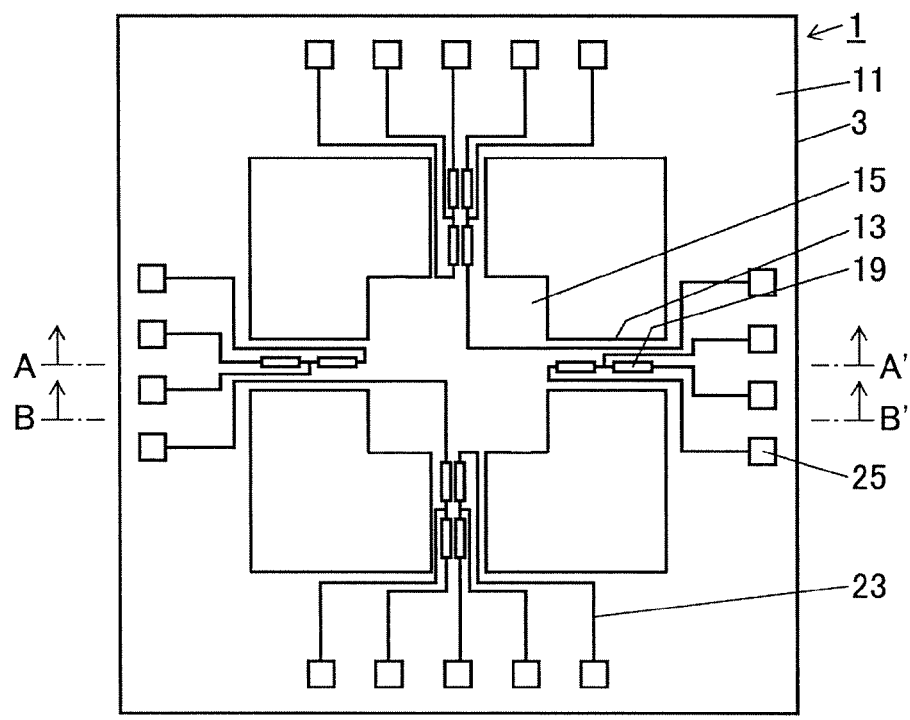
FIG. 1B is a plan view of the semiconductor sensor.
Figure 1C:
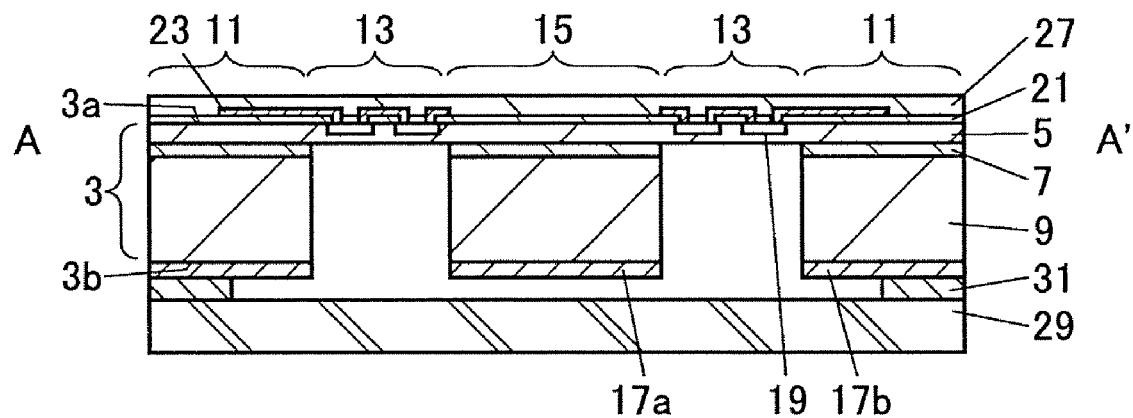
FIGS. 1C and 1D are cross-sectional views taken along lines A-A' and B-B', respectively, of the semiconductor sensor in FIG. 1B.
Figure 1D:
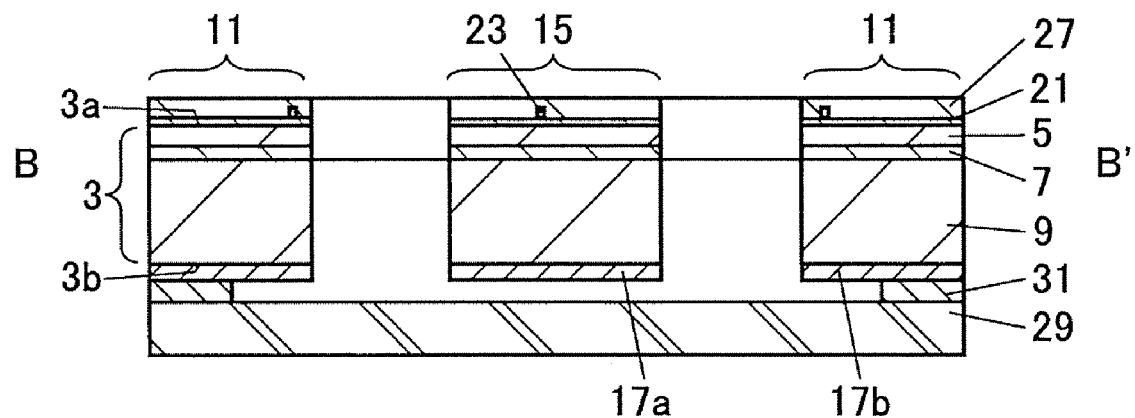

FIGS. 1A through 1D schematically show a semiconductor sensor 1 according to an embodiment of the present invention. More specifically, FIG. 1A is a perspective view, FIG. 1B is a plan view, and FIGS. 1C and 1D are cross-sectional views taken along lines A-A' and B-B', respectively, in FIG. 1B. The embodiment of the present invention is described with reference to FIGS. 1A through 1D.

The semiconductor sensor 1 is made of an SOI substrate 3 having a size of approximately 2.0 mm by approximately 2.5 mm in plan view and a thickness of approximately 400 μm. For example, the SOI substrate 3 is formed in which a first semiconductor layer of silicon 5 having a thickness of approximately 10 μm, an insulating layer 7 of an oxide silicon film having a thickness of approximately 2 μm, and a second semiconductor layer of silicon 9 having a thickness of approximately 380 μm are sequentially laminated in the order from a first surface 3$a$ to a second surface 3$b$ of the SOI substrate 3.

The semiconductor sensor 1 includes a rectangular frame-shaped supporting part 11 made of the SOI substrate. In plan view, each of the flexible parts 13 protrudes from an inner circumference of the supporting part 11 toward the center of the supporting part 11. Each of the flexible parts 13 includes the first semiconductor layer (a flexible part semiconductor layer) 5 and the insulating layer 7 and is provided one on each inner circumference side of the supporting part 11. For example, each of the flexible parts 13 has a length of approximately 0.4 mm and a width of approximately 0.09 mm. Piezoresistive elements 19 are formed in the first semiconductor layer 5 of the flexible parts 13.

In plan view, the weight part 15 provided in the center of the supporting part 11 is separated from the supporting part 11. The weight part 11 includes the first semiconductor layer 5, the insulating layer 7, and the second semiconductor layer 9. Each of the first semiconductor layer 5 and the second semiconductor layer 9 constitutes a weight part semiconductor layer of the semiconductor sensor according to an embodiment of the present invention. Further, the weight part 15 is connected to each of the flexible parts 13 provided one on each inner circumference side of the supporting part 11. The weight part 15 has a size of approximately 0.9 mm by approximately 0.9 mm in plan view.

The weight part 15 further includes a weight part photosensitive resin layer 17a on the second surface 3b of the second semiconductor layer 9. On the other hand, the supporting part 11 includes a supporting part photosensitive resin layer 17b on the second surface 3b of the second layer semiconductor layer 9.

Both the weight part photosensitive resin layer 17a and the supporting part photosensitive resin layer 17b are formed at the same time, made of the same material, and have a thickness of approximately 30 μm. The supporting part 11 and the weight part 15 have substantially the same thickness.

The material of both the weight part photosensitive resin layer 17a and the supporting part photosensitive resin layer 17b is photosensitive resin in which metal particles are included. In this embodiment, polyimide resin is used as the photosensitive resin and iridium is used as the metal of the metal particles. It should be noted that the radius of the iridium particles is less than the thickness of each of the weight part photosensitive resin layer 17a and the supporting part photosensitive resin layer 17b, and is in a range between several nm and several tens of μm. In addition, the content rate of iridium particles in each of the weight part photosensitive resin layer 17a and the supporting part photosensitive resin layer 17b is in a range between 10 and 95 volume percent. As a result, the specific gravity of each of the weight part photosensitive resin layer 17a and the supporting part photosensitive resin layer 17b is greater than that of any of the semiconductor layers 5 and 9 and the insulating layer 7.

An insulating film 21 having a thickness of 0.8 μm is formed on the first surface 3a of the SOI substrate 3. As the insulating film 21, a silicon oxide film such as an NSG (Non-doped Silicon Glass) film, a BPSG (Boro Phospho Silicate Glass) film, or a PSG (Phospho Silicate Glass) film may be used. Metal wiring patterns 23 and plural pad electrodes 25 each made of aluminum having a thickness of 1.0 μm are formed on the insulating film 21. The line widths and the pitch of the metal wiring patterns 23 are 1.4 μm and 1.5 μm, respectively. The size of each of the pad electrodes 25 is 70 mm by 70 mm in plan view. The pad electrodes 25 are formed in the supporting part 11. The metal wiring patterns 23 are electrically connected to corresponding piezoresistive elements 19. In FIGS. 1A and 1B, the piezoresistive elements 19 are shown for illustrative purposes.

A protection film 27 is formed on the insulating film 21 so as to cover not only the insulating film 21 but also the area where the metal wiring patterns 23 are formed on the insulating film 21. As the protection film 27, a passivation film including a silicon oxide film as the lower layer and a laminated-layer film composed of silicon nitride films as the upper layer may be used. An opening is formed in the protection film 27 on each of the pad electrodes 25. In FIGS. 1A and 1B, the protection film 27 is not shown for illustrative purposes.

A glass substrate 29 is bonded to a surface of the supporting part photosensitive resin layer 17b in the supporting part 11 (the surface being opposite to the surface facing the second semiconductor layer 9) via an adhesive layer 31. The glass substrate 29 serves as a stopper substrate to limit the moving range of the weight part 15. The thickness of the adhesive layer 31 is 10 μm and the distance between the weight part 15 and the glass substrate 29 is 10 μm. The adhesive layer 31 serves as a spacer.

FIGS. 2A through 2D are cross-sectional views taken along line A-A' in FIG. 1B, illustrating steps of a manufacturing method of the semiconductor sensor in FIGS. 1A through 1D. Each of the parenthetical numbers shown in FIGS. 2A through 2D corresponds to the step of the manufacturing method described below. A manufacturing method according to an embodiment of the present invention of a semiconductor sensor is described below with reference to FIGS. 2A through 2D.

Figure 2A:
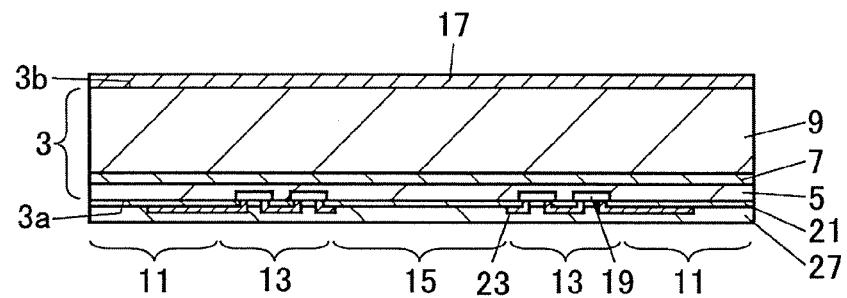
FIGS. 2A through 2D are cross-sectional views taken along line A-A' in FIG. 1B, illustrating steps of a method according to an embodiment of the present invention of manufacturing the semiconductor sensor in FIGS. 1A through 1D.

Step (1): As shown in FIG. 2A, the piezoresistive elements 19 are formed in the area where the corresponding flexible parts 13 are to be formed and in the first semiconductor layer 5 of the SOI substrate 3. It should be noted that the SOI substrate 3 includes the first semiconductor layer 5, the insulating layer 7, and the second semiconductor layer 9 as described above. The insulating film 21 is formed on the first surface 3a of the first semiconductor layer 5. Through holes are formed at prescribed positions in the insulating film 21. The metal wiring patterns 23 and the pad electrodes 25 are formed on the insulating film 21 (see FIG. 1C). A protection film 27 is formed on the surface of the insulating film 21 so as to cover not only the insulating film 21 but also the areas where the metal wiring patterns 23 and the pad electrodes 25 are formed. An opening (not shown) is formed in the protection film 27 on each of the pad electrodes 25.

Not-yet-hardened photosensitive polyimide resin in which iridium particles are dispersed is coated by the spin coating method on the second surface 3b of the SOI substrate 3 to form a photosensitive resin layer 17 having a thickness of approximately 60 μm on the second surface 3b of the SOI substrate 3. Then, the photosensitive resin layer 17 is baked at the temperature of 100° C. for approximately two minutes to evaporate residual solvent.

In this embodiment, the photosensitive polyimide resin including polyamic acid ester, methacrylate monomer, and organic titanium complex and N-methyl-2-pyrrolidone used as solvent for those substances is used (the specific gravity of the photosensitive polyimide resin is approximately 1.4). The content rate of iridium particles in the not-yet-hardened photosensitive polyimide resin is in a range between 5 to 47 volume percent so that the photo engraving process can be performed on this photosensitive polyimide resin. In this embodiment of the present invention, the spin coating method is used to form the photosensitive resin layer 17. However, the method of forming the photosensitive resin layer 17 is not limited to this spin coating method. For example, the spray coating method may be used or a sheet-shaped photosensitive resin layer may be bonded.

Figure 2B:
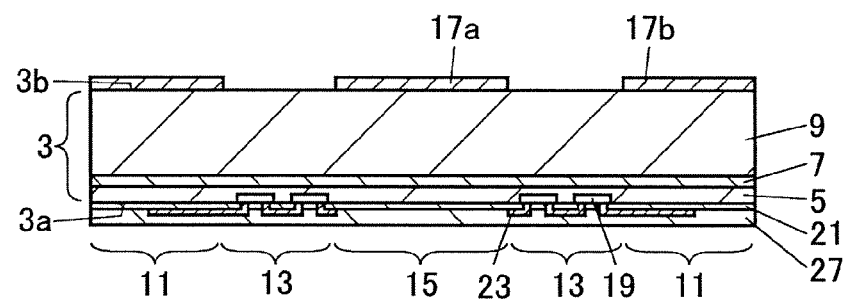

Step (2): As shown in FIG. 2B, by the photoengraving technique, the photosensitive resin layer 17 is patterned by exposing, developing, and cleaning the photosensitive resin layer 17. The weight part photosensitive resin layer 17a is formed in the area where the weight part 15 is to be formed, and the supporting part photosensitive resin layer 17b is formed in the area where the supporting area 11 is to be formed. Then the weight part photosensitive resin layer 17a and the supporting part photosensitive resin layer 17b are baked at a temperature of 350° C. for one hour. After the baking, the thickness of each of the weight part photosensitive resin layer 17a and the supporting part photosensitive resin layer 17b becomes approximately 30 μm. In this embodiment, the specific gravity of the weight part photosensitive resin layer 17a and that of the supporting part photosensitive resin layer 17b become approximately 12.

Figure 2C:
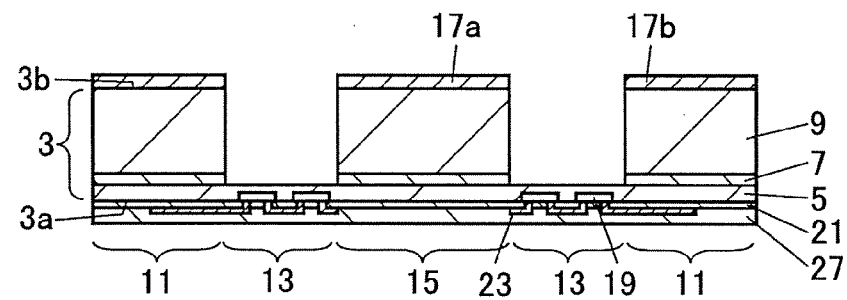

Step (3): As shown in FIG. 2C, the etching is performed from the second surface 3b side of the SOI substrate 3 to remove the second semiconductor layer 9 in the area other than the areas where the supporting part 11 and the weight part 15 are to be formed by using the weight part photosensitive resin layer 17a and the supporting part photosensitive resin layer 17b as the masks. In this dry etching process, the insulating layer 7 serves as an etching stopper layer and this etching process is continued until the insulating layer 7 in the area other than the areas where the supporting part 11 and the weight part 15 are to be formed is exposed on the second surface 3b side of the SOI substrate 3. In this process, as described above, the second semiconductor layer 9 in the area other than areas where the supporting part 11 and the weight part 15 are to be formed can be removed by using the weight part photosensitive resin layer 17a and the supporting part photosensitive resin layer 17b as the masks. Therefore advantageously, a separate process of forming a mask is not necessary. Then the exposed insulating layer 7 is removed from the second surface 3b side of the SOI substrate 3 by further etching.

In the above dry etching process, for example, an ICP (Inductive Coupled Plasma) dry etching apparatus may be used as the etching apparatus. When such an ICP dry etching apparatus is used, the SOI substrate is disposed so that the second surface 3b of the SOI substrate 3 faces a plasma room of the etching apparatus; reactant gas containing $SF_6$ (sulfur hexafluoride) and oxygen in a mixing ratio of 450 cc:45 cc by volume flows into a reaction room; the pressure in the reaction room is maintained at 90 mTorr (12 Pa); and 2700 W of high frequency power is applied to a plasma generating coil for 9 seconds to produce a physicochemical reaction between the silicon to be removed and residual and radical or the reactant gas so as to remove the silicon. Next, the inflow of $SF_6$ is stopped, 200 cc of $C_4F_8$ (perfluorocyclobutane) flows into the reacting room, and the pressure of the reacting room is maintained at 30 m Torr (4 Pa). The 2200 W of high frequency power is applied to the plasma generation coil for 3 seconds to remove the reactive product generated in the silicon removal process.

In the dry etching apparatus, 9 seconds of the silicon removal process and 3 seconds of reactive product removal process are alternately repeated to anisotropically etch the second semiconductor layer 9 of the prescribed areas.

Figure 2D:
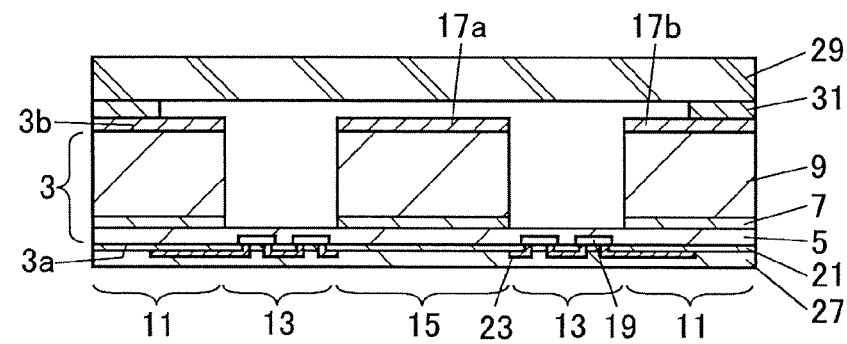

Step (4): A resist pattern for defining the areas where the flexing parts 13 and the weight part 15 are to be formed is formed on the protection film 27. By using the formed resist pattern as a mask, in areas other than areas where the supporting part 11, the flexible parts 13, and the weight part 15 are to be formed, the protection film 27, the insulating film 21, and the first semiconductor layer 5 are removed in this order from the first surface 3a side of the SOI substrate 3 to form the supporting part 11, the flexible parts 13, and the weight part 15. As shown in FIG. 2D, after the resist pattern is removed, a glass substrate 29 is bonded to the second surface 3b of the supporting part photosensitive resin layer 17b via an adhesive layer 31 (see FIGS. 1C and 1D).

Advantageously, in the semiconductor sensor 1 as manufactured above, the weight part 15 includes the weight part photosensitive resin layer 17a made of photosensitive polyimide resin in which iridium particles are included. Because of this feature, the specific gravity of the weight part photosensitive resin layer 17a becomes greater than that of either of the semiconductor layers 5 and 9. As a result, it becomes possible to increase the weight of the weight part 15 compared with a weight part having the same size as that of the weight part 15 and made of semiconductor materials only, thereby reducing the size and the thickness and improving the sensitivity of the semiconductor sensor 1.

Further, the weight part photosensitive resin layer 17a can be formed by the photoengraving technique (coating, exposing, developing, and cleaning processes of a resin layer) known as a general manufacturing process of a semiconductor device. Because of this feature, the weight of the weight part 15 can be increased compared with a weight part having the same size as that of the weight part 15 and made of semiconductor materials only by a simple method. Still further, the photoengraving technique can be used to form the weight part photosensitive resin layer 17a. Because of this feature, the weight part photosensitive resin layer 17a can be formed with high accuracy.

Still further, polyimide resin may be used as the photosensitive resin to form the weight part photosensitive resin layer 17a and the supporting part photosensitive resin layer 17b. Polyimide resin has excellent properties of heat resistance, moisture resistance and mechanical strength compared with other photosensitive resins, thereby enabling improving the reliability of the weight part photosensitive resin layer 17a and the supporting part photosensitive resin layer 17b, and ultimately the reliability of the semiconductor sensor 1.

Still further, the thickness of the entire weight part 15 is substantially the same as that of the entire supporting part 11. Because of this feature, it is possible to accurately form the gap between the weight part 15 and the glass substrate 29 bonded to the second surface 3b side of the supporting part 11. Still further, the supporting part photosensitive resin layer 17b is formed of the same materials as those of the weight part photosensitive resin layer 17a. Because of this feature, the supporting part photosensitive resin layer 17b and the weight part photosensitive resin layer 17a can be formed in a single photoengraving process.

FIGS. 3A through 3D are cross-sectional views taken along line A-A' in FIG. 1B, illustrating steps of another manufacturing method of the semiconductor sensor in FIGS. 1A through 1D. Each of the parenthetical numbers shown in FIGS. 3A through 3D corresponds to the step of the manufacturing method described below. A manufacturing method according to another embodiment of the present invention of a semiconductor sensor is described below with reference to FIGS. 3A through 3D.

Figure 3A:
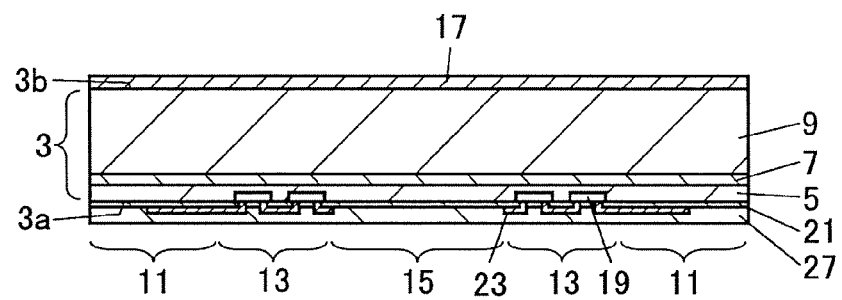
FIGS. 3A through 3D are cross-sectional views taken along line A-A' in FIG. 1B, illustrating steps of a method according to another embodiment of the present invention of manufacturing the semiconductor sensor in FIGS. 1A through 1D.

Step (1): As shown in FIG. 3A, photosensitive polyimide resin 17 in which iridium particles are dispersed is coated by the spin coating method on the second surface 3b of the SOI substrate 3 opposite to the first surface 3a of the SOI substrate on which the piezoresistive elements 19, the insulating film 21, metal wiring patterns 23, and pad electrodes 25 are formed so as to form the photosensitive resin layer 17 having a thickness of approximately 60 μm. Then, the photosensitive resin layer 17 is baked at the temperature of 100° C. for approximately two minutes to evaporate residual solvent.

Figure 3B:
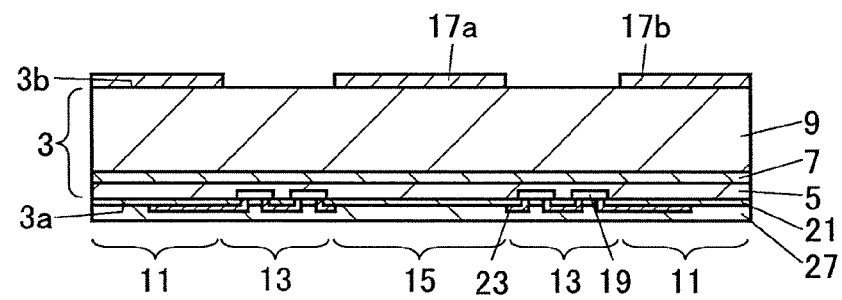

Step (2): As shown in FIG. 3B, by the photoengraving technique, the photosensitive resin layer 17 is patterned by exposing, developing, and cleaning the photosensitive resin layer 17 to form the weight part photosensitive resin layer 17a in the area where the weight part 15 is to be formed and the supporting part photosensitive resin layer 17b in the area where the supporting part 11 is to be formed. Then the weight part photosensitive resin layer 17a and the supporting part photosensitive resin layer 17b are baked at a temperature of 350° C. for one hour.

Figure 3C:
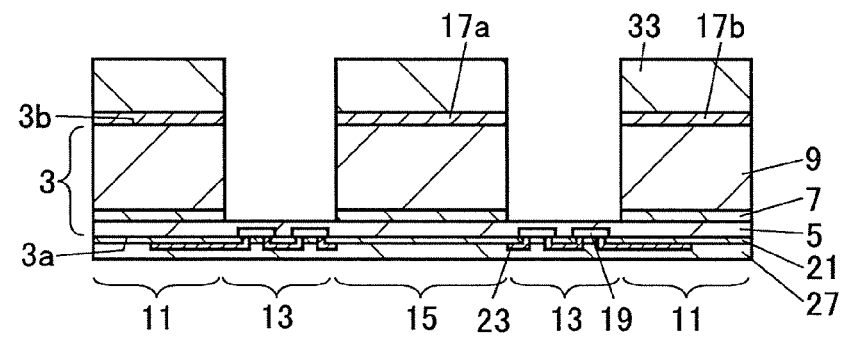
Figure 3D:
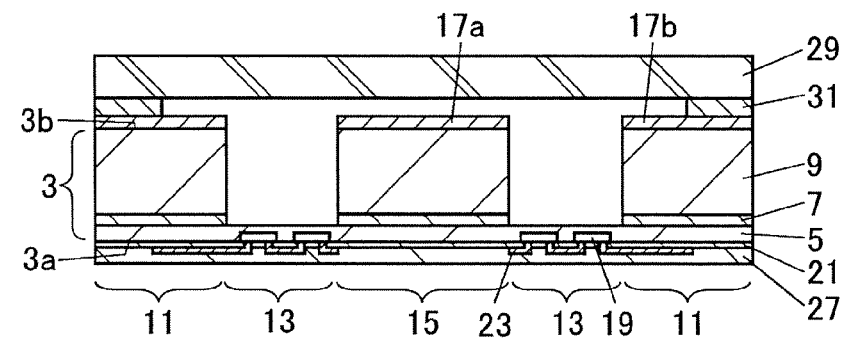

Step (3): As shown in FIG. 3C, by the photoengraving technique, a resist pattern 33 covering the areas where the supporting part 11 and the weight part 15 are to be formed is formed on the weight part photosensitive resin layer 17a and the supporting part photosensitive resin layer 17b. The dry etching is performed from the second surface 3b side of the SOI substrate 3 using the resist pattern 33 as a mask to remove the second semiconductor layer 9 in the area other than the areas where the supporting part 11 and the weight part 15 are to be formed. In this process, neither the weight part photosensitive resin layer 17a nor the supporting part photosensitive resin layer 17b is eroded due to the resist pattern 33 covering the weight part photosensitive resin layer 17a and the supporting part photosensitive resin layer 17b. After the resist pattern 33 is removed, the insulating layer 7 is removed from the second surface 3b side of the SOI substrate 3 by etching. In FIG. 3C, the resist pattern 33 is shown for illustrative purposes.

Step (4): A resist pattern defining the area where the flexible parts 13 and the weight part 15 are to be formed is formed on the protection film 27. The protection film 27, the insulating film 21, and the first semiconductor layer 5 in the area other than the areas where the supporting part 11, the flexible parts 13, and the weight part 15 are to be formed are removed from the first surface 3a side of the SOI substrate 3 using the formed resist pattern as a mask so as to form the supporting part 11, the flexible parts 13, and the weight part 15. As shown in FIG. 3C, after the resist pattern is removed, the glass substrate 29 is bonded to the supporting part photosensitive resin layer 17b of the supporting part 11 via the adhesive layer 31 (see FIGS. 1C and 1D).

In this manufacturing method according to an embodiment of the present invention, as described in the above step (3), neither the weight part photosensitive resin layer 17a nor the supporting part photosensitive resin layer 17b is eroded due to the resist pattern 33 covering the weight part photosensitive resin layer 17a and the supporting part photosensitive resin layer 17b during the etching of the second semiconductor layer 9, thereby preventing the reduction of the volume of the weight part photosensitive resin layer 17a. Further, the fluctuation of the volume of the weight part photosensitive resin layer 17a due to the fluctuation of etching time can be better controlled.

Figure 4:
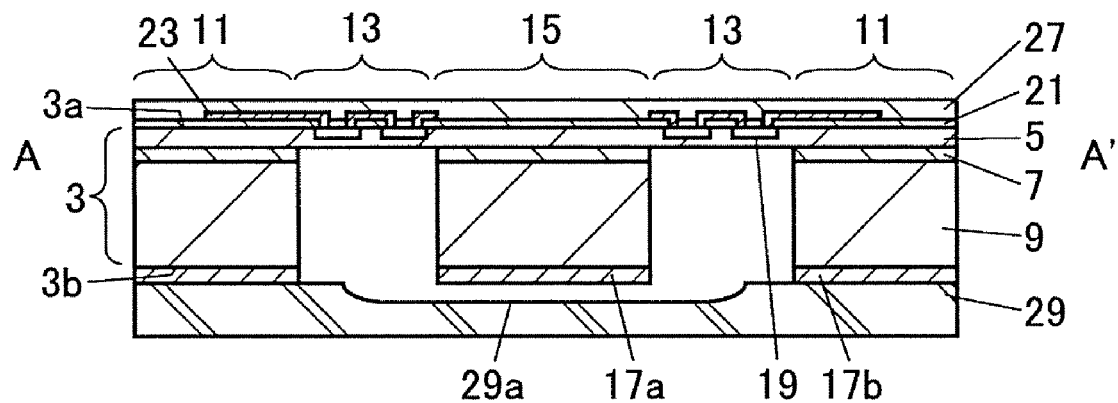
FIG. 4 is a cross-sectional view showing a semiconductor sensor according to still another embodiment of the present invention.

In the embodiment of the semiconductor sensor 1 in FIGS. 1A through 1D, the surface facing the semiconductor 1 of the glass substrate 29 serving as a stopper substrate is flat. However, as a stopper substrate, the glass substrate 29 having a concave part 29a on the surface facing the semiconductor sensor 1 may be used as shown in FIG. 4. In this embodiment, instead of using the adhesive layer 31 (as shown in FIGS. 1C and 1D), the glass substrate 29 is bonded to the supporting part 11 by anodic bonding. Obviously, as shown in FIGS. 1C and 1D, the adhesive layer 31 may be used to bond the supporting part 11 and the glass substrate 29.

Figure 5:
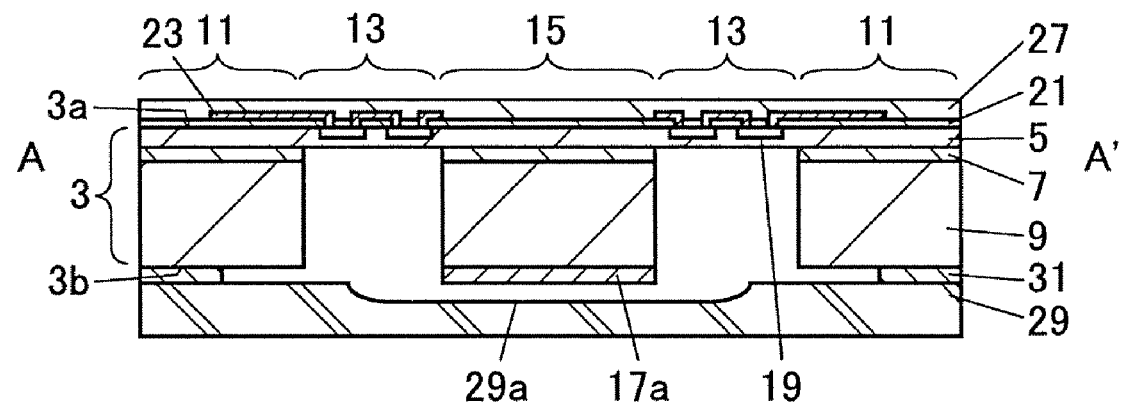
FIG. 5 is a cross-sectional view showing a semiconductor sensor according to still another embodiment of the present invention.

Further, as shown in FIG. 5, the supporting part photosensitive resin layer 17b may be arranged so as not to be formed on the second surface 3b side of the supporting part 11. This configuration can be obtained by arranging the photoengraving process in step (2) with reference to FIG. 2B or in step (2) with reference to FIG. 3B so as to form the weight part photosensitive resin layer 17a only from the photosensitive resin 17. Still further, in the configuration in FIG. 5, the supporting part 11 is bonded to the glass substrate 29 with the adhesive layer 31. However, for example, the supporting part 11 and the glass substrate 29 may be bonded together by anodic bonding by adjusting the depth of the concave part 29a. Or, the glass substrate without the concave part 29a may be used by adjusting the thickness of the adhesive layer 31.

Figure 6A:
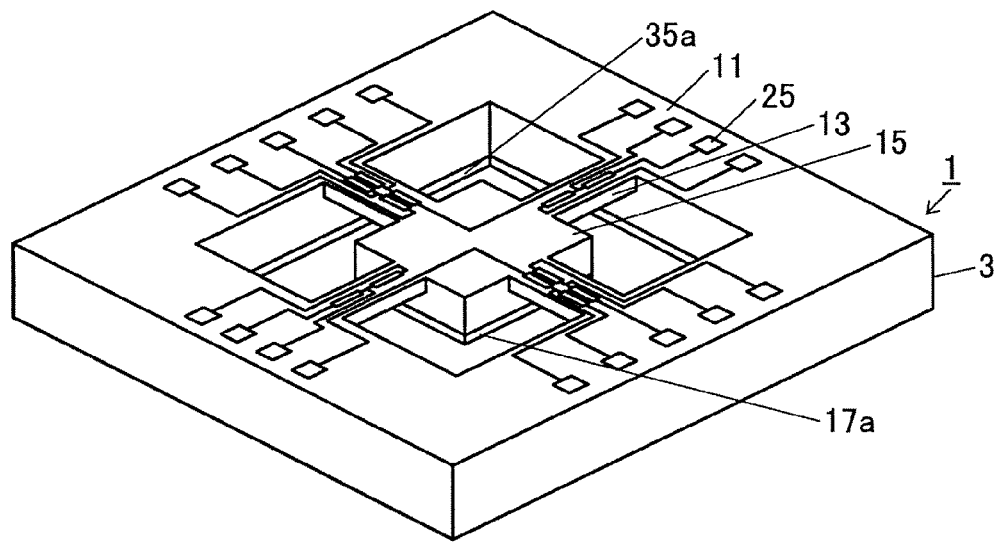
FIG. 6A is a perspective view showing a semiconductor sensor according to still another embodiment of the present invention.
Figure 6B:
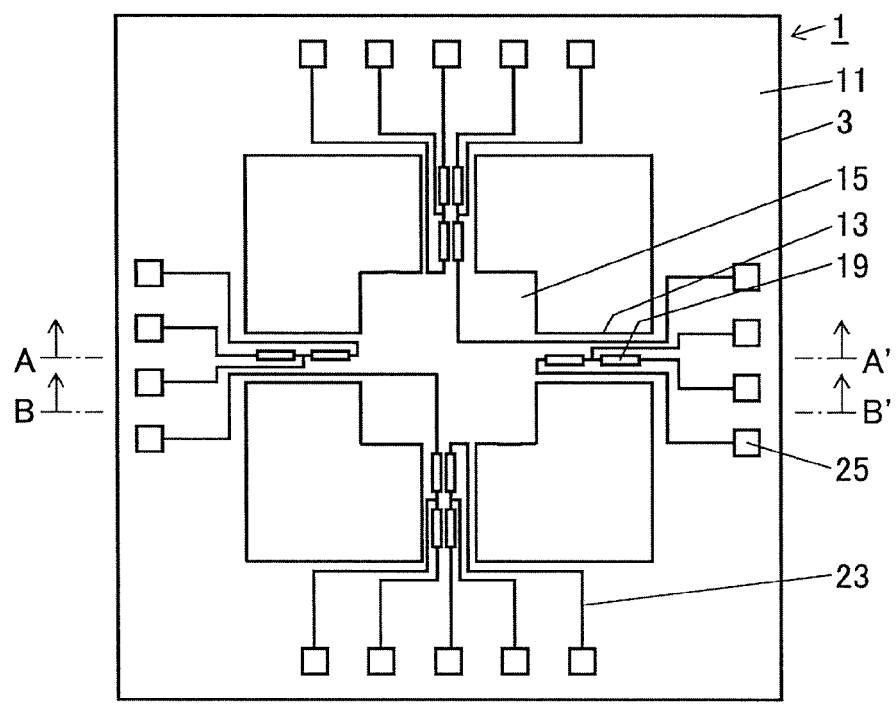
FIG. 6B is a plan view of the semiconductor sensor.
Figure 6C:
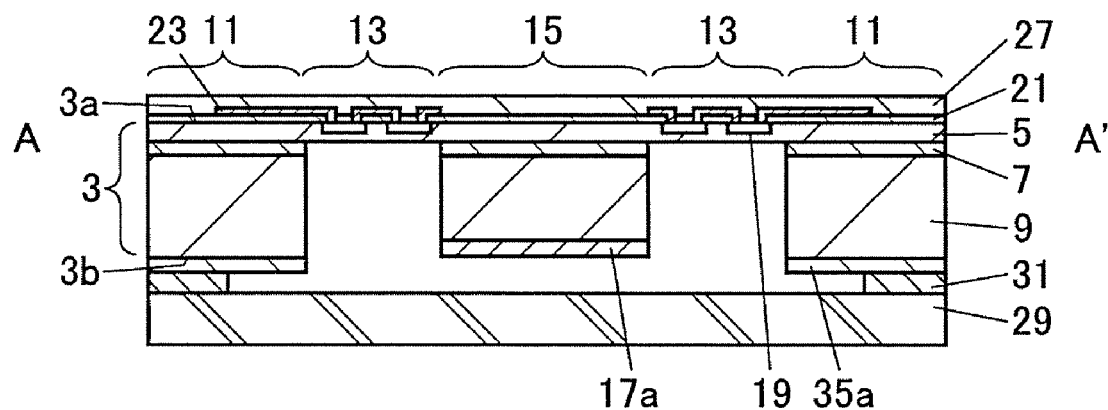
FIGS. 6C and 6D are cross-sectional views taken along lines A-A' and B-B', respectively, of the semiconductor sensor in FIG. 6B.
Figure 6D:
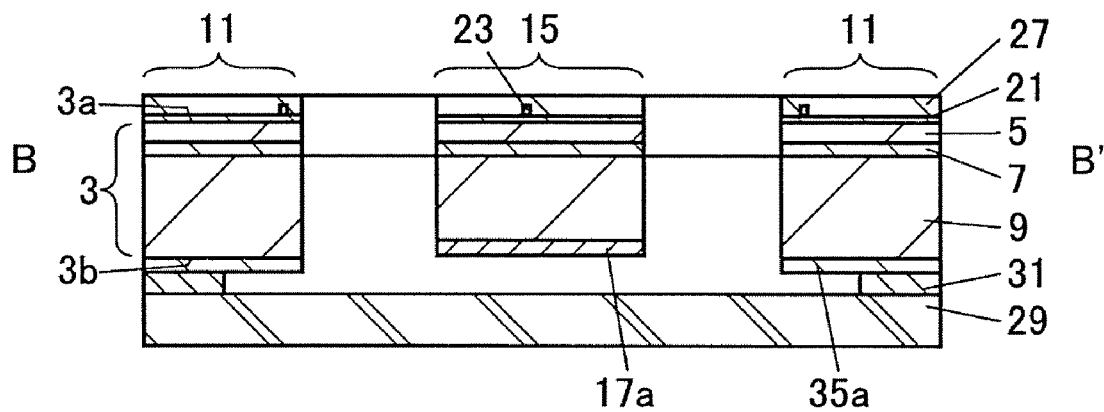

FIGS. 6A through 6D schematically show a semiconductor sensor 1 according to still another embodiment of the present invention. More specifically, FIG. 6A is a perspective view, FIG. 6B is a plan view, and FIGS. 6C and 6D are cross-sectional views taken along lines A-A' and B-B', respectively, in FIG. 6B. The same reference numerals are used in FIGS. 6A through 6D to describe those elements identical to those in FIGS. 1A through 1D. The embodiment of the present invention is described with reference to FIGS. 6A through 6D.

The configuration according to this embodiment of the present invention as shown in FIGS. 6A through 6D is different from that of the configuration in FIGS. 1A through 1D in that the thickness of the second semiconductor layer 9 of the weight part 15 is less than that of the second semiconductor layer 9 of the supporting part by 30 μm; and the supporting part photosensitive resin layer 17b (as shown in FIGS. 1C and 1D) is not formed on the second surface 3b of the second semiconductor layer 9 of the supporting part 11, and insulating patterns 35a made of a silicon oxide film having a thickness of approximately 1 μm are formed.

FIGS. 7A through 7F are cross-sectional views taken along line A-A' in FIG. 6B, illustrating steps of still another manufacturing method of the semiconductor sensor in FIGS. 6A through 6D. Each of the parenthetical numbers shown in FIGS. 7A through 7F corresponds to the step of the manufacturing method described below. In the following, a manufacturing method according to still another embodiment of the present invention of a semiconductor sensor is described with reference to FIGS. 7A through 7F.

Figure 7A:
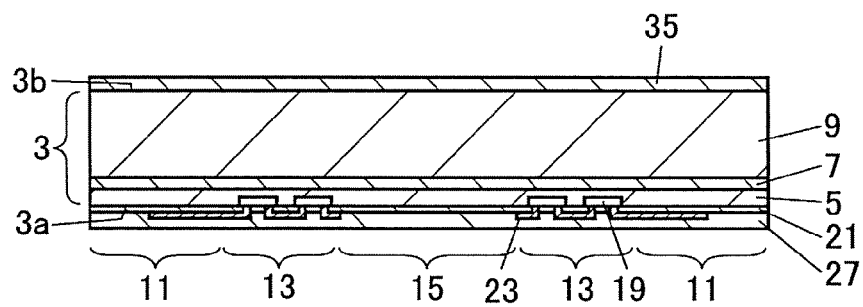
FIGS. 7A through 7F are cross-sectional views taken along line A-A' in FIG. 6B, illustrating steps of a method according to another embodiment of the present invention of manufacturing the semiconductor sensor in FIGS. 6A through 6D.

Step (1): As shown in FIG. 7A, an insulating film 35 made of a silicon oxide film having a thickness of approximately 3 μm is formed on the second surface 3b of the SOI substrate 3 opposite to the first surface 3a of the SOI substrate on which the piezoresistive elements 19, the insulating film 21, metal wiring patterns 23, pad electrodes 25, and the protection film 27 are formed.

Figure 7B:
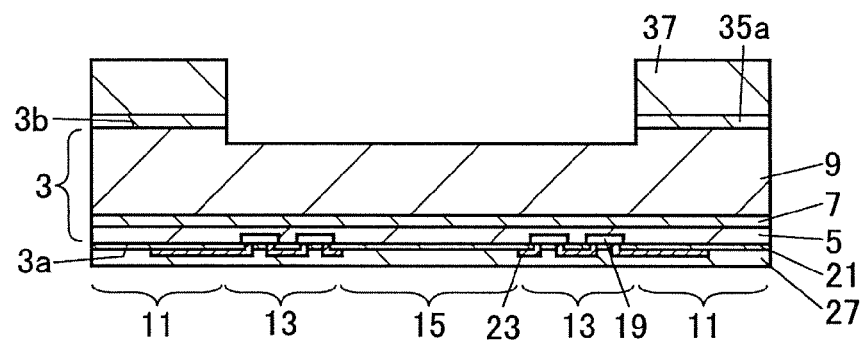

Step (2): As shown in FIG. 7B, by the photoengraving technique, a resist pattern 37 covering the area where the supporting part 11 is to be formed is formed on the insulating film 21. By the dry etching technique, the insulating film 35 is patterned using the resist pattern 37 as a mask to form the insulating pattern 35a in the area where the supporting part 11 is to be formed. Further, the second semiconductor pattern 9 is etched by approximately 30 μm using the resist pattern 37 as a mask. By doing this, a concave part is formed on the second semiconductor layer 9. Otherwise, the entire second semiconductor layer 9 in the area other than the areas covered by the insulating patterns 35a may be removed.

Figure 7C:
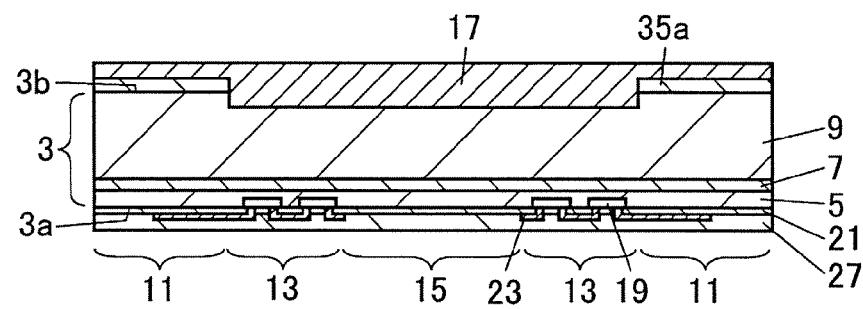

Step (3): As shown in FIG. 7C, the resist pattern 37 is removed. The photosensitive polyimide resin in which iridium particles are dispersed is coated by the spin coating method on the second surface 3b of the SOI substrate 3 to form a photosensitive resin layer 17. In this case, the photosensitive resin layer 17 having a thickness at the concave part of approximately 60 μm is formed. Then, the photosensitive resin layer 17 is formed on the insulating patterns 35a as well due to the depth of the concave part in the second semiconductor layer 9 being approximately 30 μm and the thickness of the insulating patterns 35a being approximately 3 μm. Then, the photosensitive resin layer 17 is baked at the temperature of 100° C. for approximately two minutes to evaporate residual solvent.

Figure 7D:
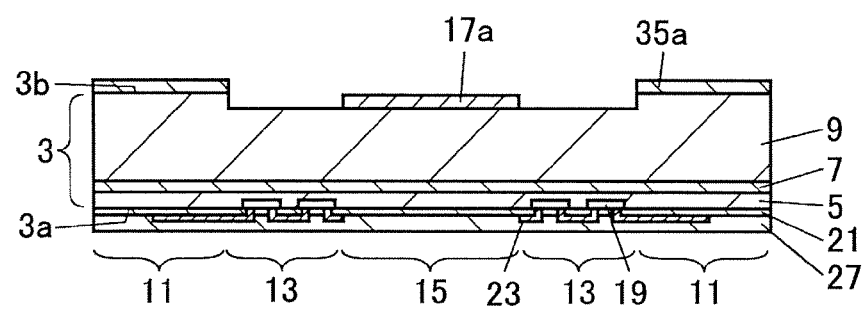

Step (4): As shown in FIG. 7D, by the photoengraving technique, the photosensitive resin layer 17 is patterned by exposing, developing, and cleaning the photosensitive resin layer 17 to form the weight part photosensitive resin layer 17a in the area where the weight part 15 to be formed. Then the semiconductor is baked at a temperature of 370° C. for one hour. After the baking, the thickness of the weight part photosensitive resin layer 17a is approximately 30 µm.

Figure 7E:
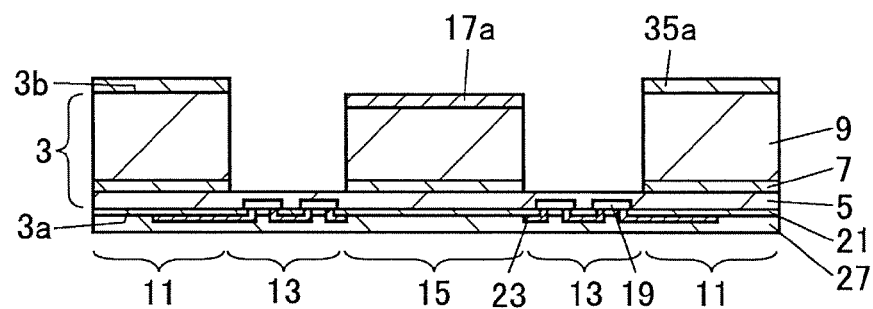

Step (5): As shown in FIG. 7E, the second semiconductor layer 9 in the area other than the areas where the supporting part 11 and the weight area 15 are to be formed is removed by etching from the second surface 3b side of the SOI substrate 3 using the weight part photosensitive resin layer 17a and the insulating patterns 35a as the masks. In this method, the weight part photosensitive resin layer 17a and the insulating patterns 35a serve as the masks to remove the second semiconductor layer 9 in the area other than the areas where the supporting part 11 and the weight area 15 are to be formed. Therefore, it is not necessary to form a mask separately. Then, the exposed insulating layer 7 is removed by further etching from the second surface 3b side of the SOI substrate 3. In this case, the insulating film patterns 35a are also etched. However, the thickness of the insulating film patterns 35a before the etching is greater than that of the insulating layer 7. Therefore, the insulating film patterns 35a remain on the second semiconductor layer 9 of the supporting part 11.

Figure 7F:
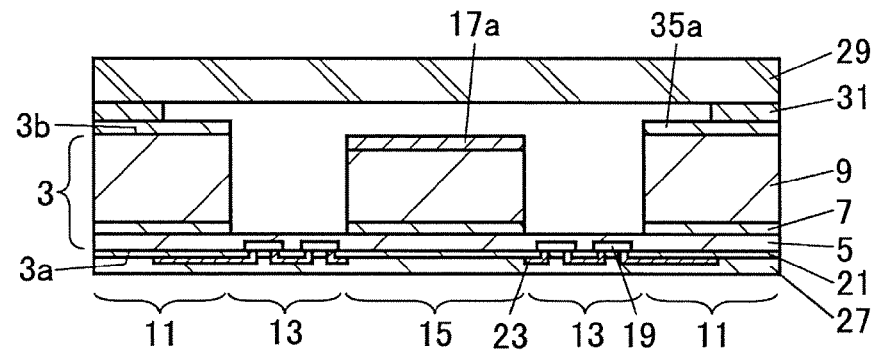

Step (6): A resist pattern for defining the areas where the flexing parts 13 and the weight part 15 are to be formed is formed on the protection film 27. By using the formed resist pattern as a mask, in each area other than areas where the supporting part 11, the flexible parts 13, and the weight part 15 are to be formed, the protection film 27, the insulating film 21, and the first semiconductor layer 5 are removed in this order from the first surface 3a side of the SOI substrate 3 to form the supporting part 11, the flexible parts 13, and the weight part 15. As shown in FIG. 7F, after the resist pattern is removed, a glass substrate 29 is bonded to the surface of the insulating film patterns 35a of the supporting part 11 via the adhesive layer 31 (see FIGS. 6C and 6D).

Advantageously, in the semiconductor sensor 1 as manufactured above, the same as the embodiment shown in FIGS. 1A through 1D, the weight part photosensitive resin layer 17a includes iridium particles. Because of this feature, the specific gravity of the weight part photosensitive resin layer 17a becomes greater than that of any of the semiconductor layers 5 and 9. As a result, it becomes possible to increase the weight of the weight part 15 compared with a weight part having the same size as that of the weight part 15 and made of semiconductor materials only.

Further, the weight part photosensitive resin layer 17a can be formed by the photoengraving technique known as a general manufacturing process of semiconductor devices. Because of this feature, by using this simple method, the weight of the weight part 15 can be increased compared with a weight part having the same size as that of the weight part 15 and made of semiconductor materials only, and the weight part photosensitive resin layer 17a can be formed with high accuracy.

Figure 8:
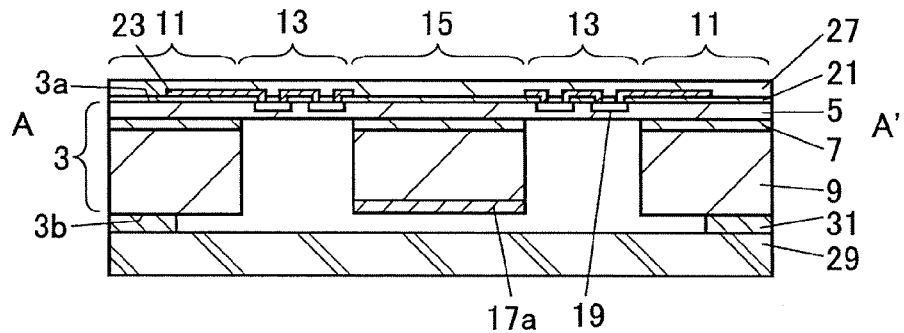
FIG. 8 is a cross-sectional view showing a semiconductor sensor according to still another embodiment of the present invention.

Further, in the embodiment of the present invention shown in FIGS. 6A through 6D, the insulating film patterns 35a are formed on the second surface 3b of the supporting part 11. However, as shown in FIG. 8, the insulating film patterns 35 may be arranged so as not be formed on the second surface 3b of the supporting part 11. This configuration can be obtained by inserting a new step of removing the insulating film patterns 35a between step (2) and step (3) shown in FIGS. 7B and 7C, respectively, or removing the entire insulating film patterns 35a in step (5) described with reference to FIG. 7E.

Figure 9:
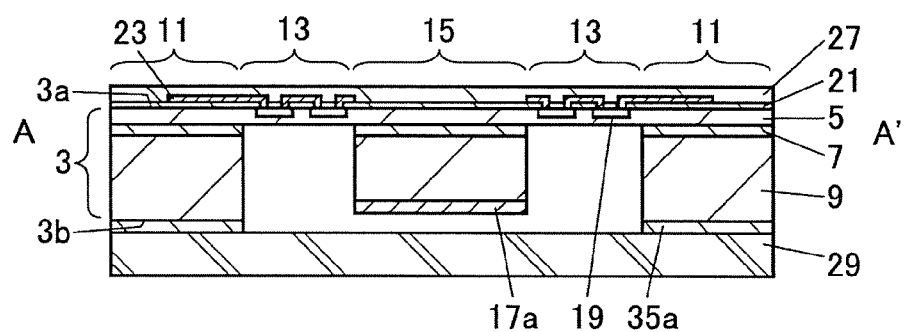
FIG. 9 is a cross-sectional view showing a semiconductor sensor according to still another embodiment of the present invention.

Still further, in the embodiment of the present invention shown in FIGS. 6C and 6D, the supporting part 11 and the glass substrate 29 are bonded together via the adhesive layer 31. However, as shown in FIG. 9, instead of using the adhesive layer 31 (as shown in FIGS. 6C and 6D), the insulating film patterns 35a of the supporting part 11 and the glass substrate 29 are bonded together by anodic bonding. By adjusting the thicknesses of the second semiconductor layer 9 of the weight part 15, the weight part photosensitive resin layer 17a, and the insulating film patterns 35a, it is possible to form a gap having a desired distance between the weight part 15 and the glass substrate 29 even when the glass substrate 29 has a flat surface facing the semiconductor sensor side. Further, in the embodiment of the present invention shown in FIG. 8, the second surface 3b of the supporting part 11 and the glass substrate 29 may also be bonded together by anodic bonding.

Figure 10:
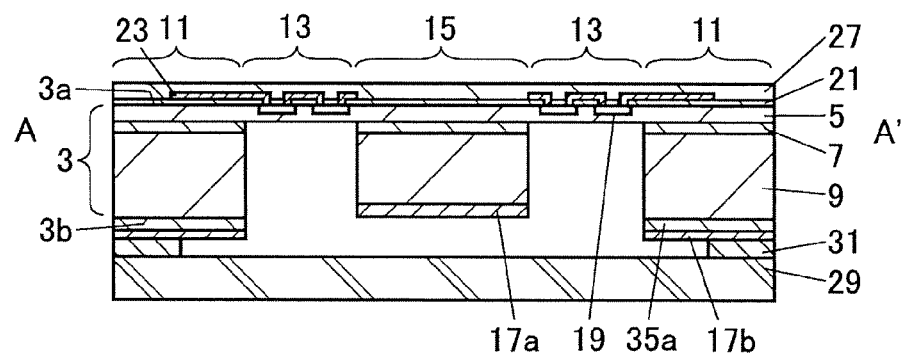
FIG. 10 is a cross-sectional view showing a semiconductor sensor according to still another embodiment of the present invention.

Still further, as shown in FIG. 10, the supporting part photosensitive resin layer 17b may be formed on the insulating patterns 35a. This configuration can be obtained by arranging to form the supporting part photosensitive resin layer 17b on the insulating film patterns 35a from the photosensitive layer 17 in step (4) described with reference to FIG. 7D. In the embodiment of the present invention shown in FIG. 10, instead of using the adhesive layer 31, the supporting part photosensitive resin layer 17b of the supporting part 11 and the glass substrate 29 may also be bonded together by anodic bonding.

Figure 11:
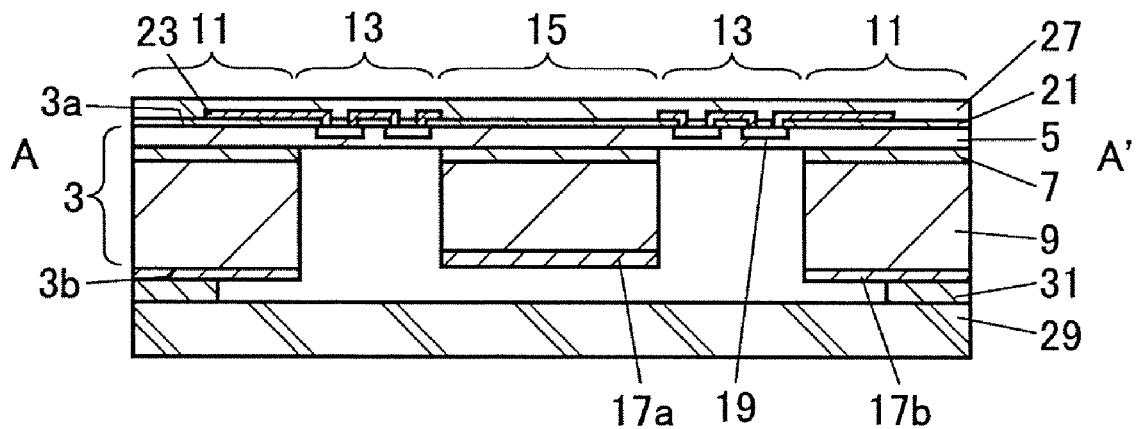
FIG. 11 is a cross-sectional view showing a semiconductor sensor according to still another embodiment of the present invention.

Still further, as shown in FIG. 11, the supporting part photosensitive resin layer 17b may be formed on the second surface 3b of the supporting part 11 where no insulating film patterns 35a are formed (see FIGS. 6C and 6D). This configuration can be obtained by inserting a new step of removing the insulating film patterns 35a between step (2) and step (3) shown in FIG. 7B and FIG. 7C, respectively, and arranging to form the supporting part photosensitive resin layer 17b from the photosensitive resin layer 17 in the area where the supporting part 11 is to be formed. In the embodiment of the present invention shown in FIG. 11 as well, instead of using the adhesive layer 31, the supporting part photosensitive resin layer 17b of the supporting part 11 and the glass substrate 29 may be bonded together by anodic bonding.

Still further, in the embodiments of the present invention shown in FIGS. 6A through 6D, and 8 though 11, the semiconductor-sensor-side surface of the glass substrate 29 is flat. However, the same as the glass substrate 29 shown in FIG. 9, the glass substrate 29 having the concave part 29a on the surface facing the semiconductor sensor may be used.

Still further, in step (5) of the manufacturing method according to the embodiment of the present invention described with reference to FIG. 7E, the second semiconductor layer 9 is etched using the weight part photosensitive resin layer 17a and the insulating film patterns 35a as the masks. However, same as the manufacturing method according to the embodiment of the present invention described with reference to FIG. 3C, the resist pattern 33 covering the area where the supporting part 11 and the weight part 15 are to be formed may be formed, and the second semiconductor layer 9 is etched using the formed resist pattern 33 as the mask. By doing this, it becomes possible to prevent the weight part photosensitive resin layer 17a from being eroded. It should be noted that in each of the manufacturing methods shown in FIGS. 8 through 11, the resist pattern 33 covering the area where the supporting part 11 and the weight part 15 are to be formed may be formed.

Although the embodiments of the present invention are described, the embodiments of the present invention is not limited to the embodiment described above. Namely, any condition including the size, the shape, the material, the arrangements, and the temperatures in the manufacturing process described in the embodiments is an example only. Therefore, various modifications and can be made without departing from the scope of the present invention described in appended claims.

For example, the SOI substrate 3 is used as the semiconductor substrate in the above embodiments. However, a bulk semiconductor substrate may be used as the semiconductor substrate.

Further, in each manufacturing method according to the embodiment of the present invention, the photosensitive resin is coated only once to form the weight part photosensitive resin layer 17a made of one layer of the photosensitive resin. However, the thickness of the weight part photosensitive resin layer 17a may be increased by repeating the coating, exposing, developing, and cleaning processes of the photosensitive resin and laminating the formed photosensitive resin layers. In the same manner, the thickness of the supporting part photosensitive resin layer 17b may also be increased. Further, in forming the photosensitive resin layers, the thickness of the weight part photosensitive resin layer 17a may be arranged to be different from that of the supporting part photosensitive resin layer 17b by changing the number of layers to be laminated between the weight part photosensitive resin layer 17a and the supporting part photosensitive resin layer 17b.

Figure 12:
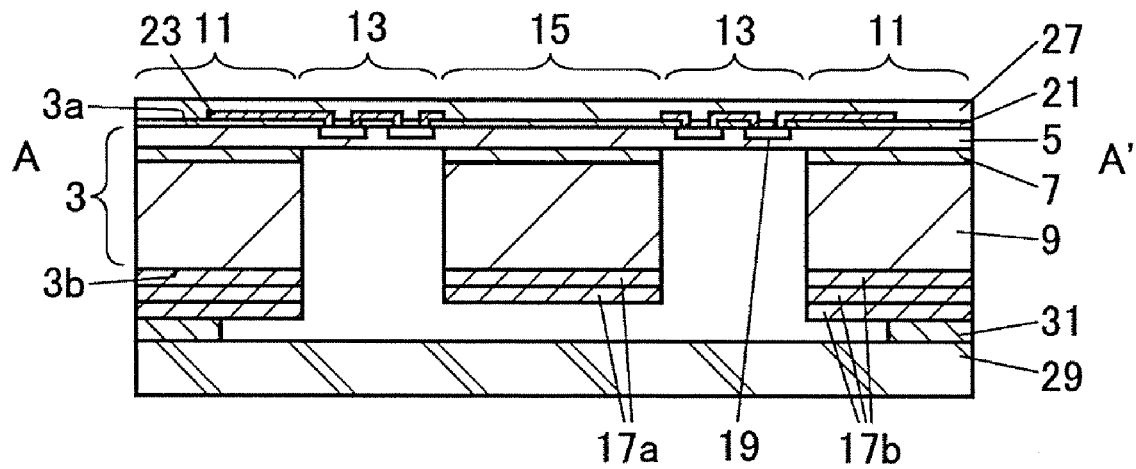
FIG. 12 is a cross-sectional view showing a semiconductor sensor according to still another embodiment of the present invention.
Figure 13A:
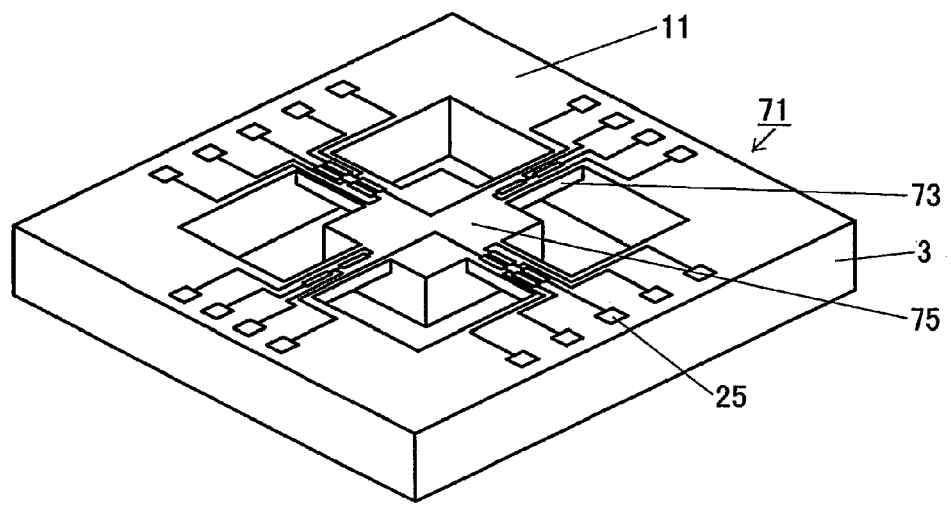
FIG. 13A is a perspective view showing an example of a conventional semiconductor sensor.
Figure 13B:
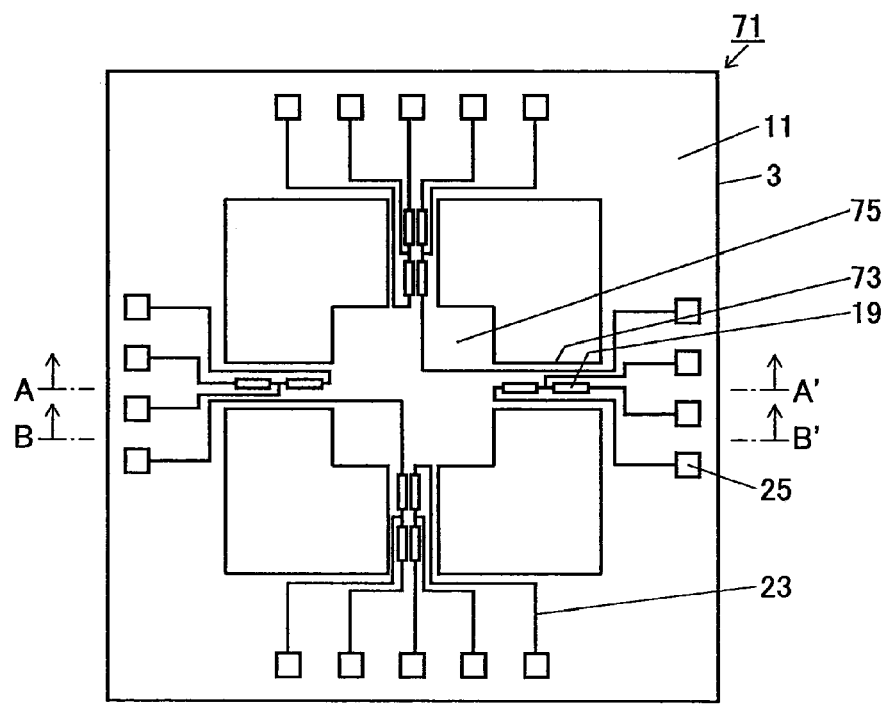
FIG. 13B is a plan view of the semiconductor sensor.
Figure 13C:
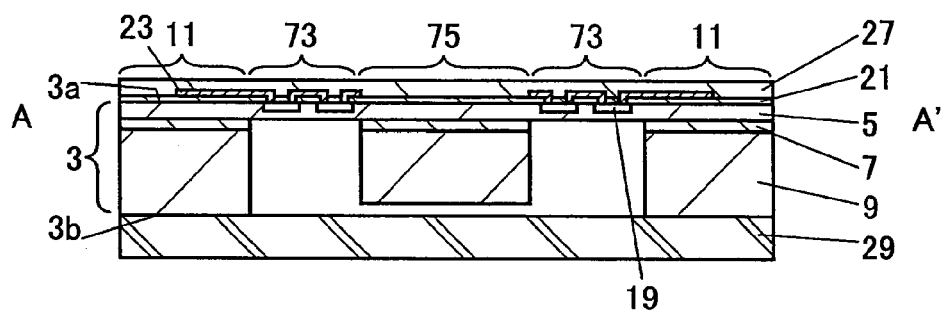
FIGS. 13C and 13D are cross-sectional views taken along lines A-A' and B-B', respectively, of the semiconductor sensor in FIG. 13B.
Figure 13D:
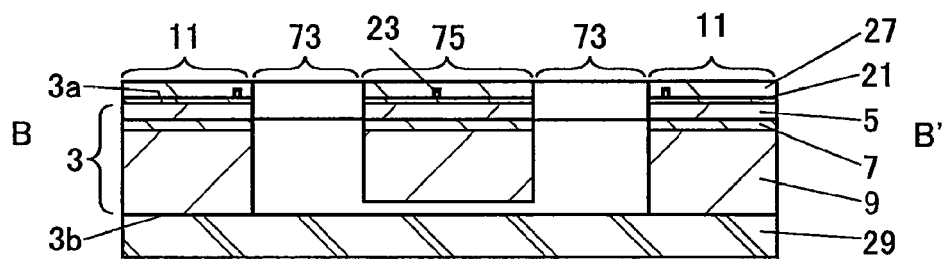
Figure 14A:
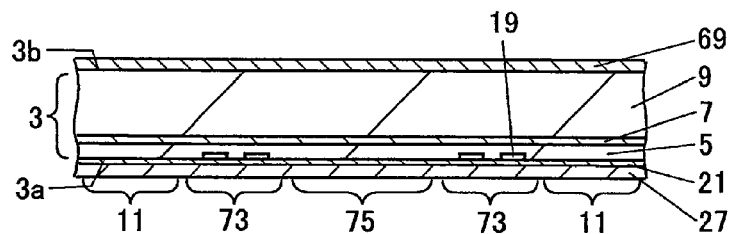
FIGS. 14A through 14F are cross-sectional views taken along line A-A' in FIG. 13B, illustrating steps of a conventional method of manufacturing the semiconductor sensor in FIGS. 13A through 13D.
Figure 14B:
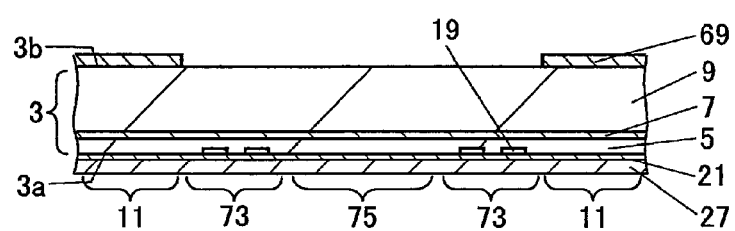
Figure 14C:
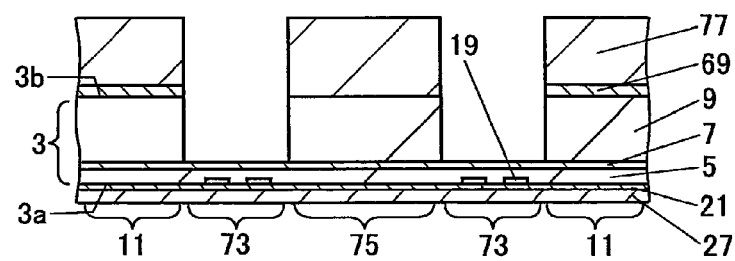
Figure 14D:
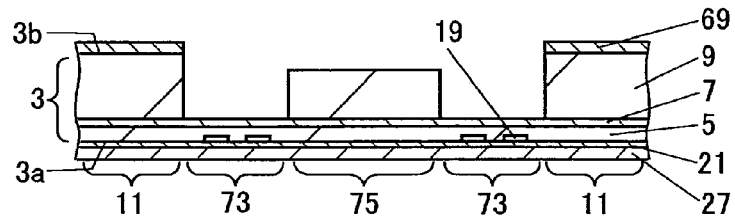
Figure 14E:
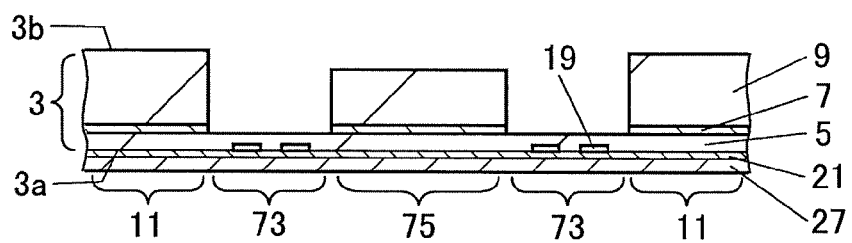
Figure 14F:
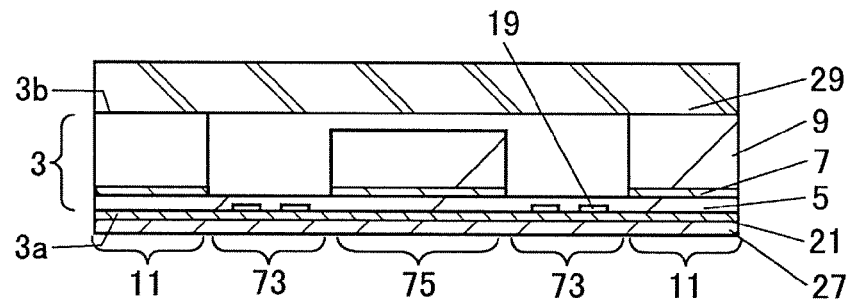

For example, as shown in FIG. 12, a two-layered weight part photosensitive resin layer 17a in the weight part 15 and a three-layered supporting part photosensitive resin layer 17b in the supporting part 11 may be formed. In the weight part 15, by laminating the weight part photosensitive resin layers 17a, the volume of the weight part photosensitive resin layer 17a with respect to the entire weight part 15 is increased and the weight of the entire weight part 15 can also be increased compared with the semiconductor sensor shown in FIGS. 1A through 1D.

Further, by making the number of the laminated supporting part photosensitive resin layers 17b in the supporting part 11 to be more than that of the laminated weight part photosensitive resin layers 17a in the weight part 15, the thickness of the entire supporting part 11 can be accurately made greater than that of the entire weight part 15 without including the step of reducing the thickness of the second semiconductor layer 9 of the weight part 15 so as to be less than that of the second semiconductor layer 9 of the supporting part 11. However, it should be noted that the number of laminated layers in the weight part photosensitive resin layer 17a may be the same as that of laminated layers in the support part photosensitive resin layer 17b. A greater number of photosensitive resin layers may be laminated to form the weight part photosensitive resin layer 17a than in the support part photosensitive resin layer 17b. Three or more photosensitive resin layers may be laminated to form the weight part photosensitive resin layer 17a, and two or more than three photosensitive resin layers may be laminated to form the supporting part photosensitive resin layer 17b.

Still further, in FIG. 12, the supporting part photosensitive resin layer 17b in the supporting part 11 and the glass substrate 29 are bonded together via the adhesive layer 31. However, in the above configuration, the thickness of the entire supporting part 11 is greater than that of the entire weight part 15. Therefore, even when the supporting part photosensitive resin layer 17b of the supporting part 11 and the glass substrate 29 having a flat surface facing to the semiconductor sensor 1 are bonded together by anodic bonding, a gap having a prescribed size can be formed between the weight part 15 and the glass substrate 29 without using the adhesive layer 31 or any other spacer.

Still further, in the method according to an embodiment of the present invention, after the second semiconductor layer 9 in a proscribed area is removed from the second surface 3b side of the SOI substrate 3, the first semiconductor layer 5 in a proscribed area is removed from the first surface 3a side of the SOI substrate 3. However, this order may be changed. That is, the first semiconductor layer 5 in a proscribed area may be removed first from the first surface 3a side of the SOI substrate 3.

Still further, in the semiconductor sensor 1 according to the embodiment of the present invention, the weight part 15 is supported by four flexible parts 13. However, the present invention is not limited to this configuration. For example, as disclosed in Japanese Patent Application Publication No. 2003-270262, a semiconductor sensor and a method of the same in which two flexible parts may be provided to support the weight part (double holding type) or one flexible part may be provided to support the weight part (single holding type) is also within the scope of the present invention.

Still further, in the semiconductor sensor 1 according to the embodiment of the present invention, the shape of the weight section 15 is substantially a rectangle in plan view. However, the shape of the weight part 15 according to an embodiment of the present invention is not limited to this shape. For example, a weight part having a cloverleaf shape as disclosed in Japanese Patent Application Publication No. 2007-033355, or any other shape in plan view may be used.

Still further, in the semiconductor sensor 1 according to the embodiment of the present invention, the size of the weight part photosensitive resin layer 17a in plan view is substantially the same as that of the second semiconductor layer 9 in the weight part 15. However, the configuration according to an embodiment of the present invention is not limited to this relationship. For example, in the weight part 15, the size of the weight part photosensitive resin layer 17a in plan view may be larger than that of the second semiconductor layer 9. Such a configuration can be obtained by forming the weight part photosensitive resin layer 17a, and making the size in plan view of the resist pattern covering the weight part photosensitive resin layer 17a to be larger than that of the weight part photosensitive resin layer 17a when the second semiconductor layer 9 of the weight part 15 is patterned using the resist pattern.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teachings herein set forth.

The present application is based on and claims the benefit of priority of Japanese Patent Application No. 2007-115735, filed on Apr. 25, 2007, the entire contents of which are hereby incorporated herein by reference.

What is claimed is:

1. A semiconductor sensor comprising:
   a weight part including
      a weight part semiconductor layer made of a semiconductor material, and
      a weight part photosensitive resin layer made of photosensitive resin including metal particles, wherein a specific gravity of the weight part photosensitive resin layer is greater than that of the weight part semiconductor layer due to the metal particles included in the weight part photosensitive resin layer;

a supporting part surrounding and separated from the weight part, including
a supporting part semiconductor layer made of a semiconductor material;
a flexible part connecting the weight part at one end of the flexible part and the supporting part at the other end of the flexible part so as to support the weight part, including
a flexible part semiconductor layer made of a semiconductor material; and
plural piezoresistive elements formed in the flexible part semiconductor layer.

2. The semiconductor sensor according to claim 1, wherein the photosensitive resin is polyimide resin.

3. The semiconductor sensor according to claim 1, wherein a metal of the metal particles is iridium, silver, or bismuth.

4. The semiconductor sensor according to claim 1, wherein the supporting part further includes a supporting part photosensitive resin layer having substantially the same thickness and the same material as those of the weight part photosensitive resin layer; and
the thickness of the entire weight part is substantially the same as that of the entire supporting part.

5. The semiconductor sensor according to claim 1, wherein the weight part, the supporting part, and the flexible part are formed by processing an SOI substrate including, from a surface side of the SOI substrate, a first semiconductor layer, an insulating layer, and a second semiconductor layer;
the flexible part includes the first semiconductor layer, and each of the weight part and the supporting part includes the first semiconductor layer, the insulating layer, and the second semiconductor layer; and
the weight part photosensitive resin layer is formed on the second semiconductor layer of the weight part.

6. A method of manufacturing the semiconductor sensor, comprising the steps of:
(A): forming a photosensitive resin layer by coating photosensitive resin including metal particles on a second surface side of a semiconductor substrate opposite to a first surface side of the semiconductor substrate on which the piezoresistive elements are formed;
(B): forming the weight part photosensitive resin layer in an area where the weight part is to be formed by patterning the photosensitive resin layer through processes including exposing, developing, and cleaning; and
(C): forming the weight part semiconductor layer, the flexible part semiconductor layer, and the supporting part by executing steps including
etching the semiconductor substrate from the second surface side of the semiconductor substrate to a predetermined depth in an area other than an area where one of the weight part and the supporting part is to be formed, and
etching the semiconductor substrate from the first surface side of the semiconductor substrate to a predetermined depth in a prescribed area other than an area where one of the weight part, the flexible part, and the supporting part is to be formed.

7. The method of manufacturing the semiconductor sensor according to claim 6, wherein
the photosensitive resin is polyimide resin.

8. The method of manufacturing the semiconductor sensor according to claim 6, wherein
a metal of the metal particles is iridium, silver, or bismuth.

9. The method of manufacturing the semiconductor sensor according to claim 6, wherein
in the step (A), before forming the photosensitive resin layer, a step is included of etching the semiconductor substrate of the weight part to a prescribed depth from the second surface side of the semiconductor substrate so as to make the thickness of the semiconductor substrate in the area where the weight part is to be formed to be less than that of the semiconductor substrate in the area where the supporting part is to be formed.

10. The method of manufacturing the semiconductor sensor according to claim 6, wherein
in step (B), when the photosensitive resin layer is patterned, in the area where the supporting part is to be formed, a supporting part photosensitive resin layer is formed from the photosensitive resin layer.

11. The method of manufacturing the semiconductor sensor according to claim 6, wherein
in step (C), a step is included of forming a resist pattern on the second surface side of the semiconductor substrate, the resist pattern covering at least an area where the weight part and the supporting part are to be formed, and the resist pattern serves as a mask when the semiconductor substrate is etched from the second surface side of the semiconductor substrate.

12. The method of manufacturing the semiconductor sensor according to claim 6, wherein
an SOI substrate is used as the semiconductor substrate; the SOI substrate including from the first surface side of the SOI substrate, a first semiconductor layer, an insulating layer, and a second semiconductor layer laminated together, and
in step (C), when the semiconductor layer is etched from the second surface side of the semiconductor substrate, the insulating layer serves as an etching stopper layer.

13. The method of manufacturing the semiconductor sensor according to claim 9, wherein
in step (A), an insulating film pattern is formed on the second surface of the semiconductor substrate in the area where the supporting part is to be formed, the insulating film pattern serving as a mask when the semiconductor substrate in the prescribed area is etched from the second surface side of the semiconductor substrate; the insulating film pattern is retained after the semiconductor substrate in the prescribed area is etched from the second surface side of the semiconductor substrate to the prescribed depth; and the photosensitive resin layer is formed on the insulating film pattern as well, and
in step (c), when the semiconductor substrate is etched from the second surface side of the semiconductor substrate, the weight part photosensitive resin layer and the insulating film pattern serve as masks.

14. The method of manufacturing the semiconductor sensor according to claim 10, wherein
in step (C), when the semiconductor substrate is etched from the second surface side of the semiconductor substrate, the weight part photosensitive resin layer and the supporting part photosensitive rein layer serve as a mask.

* * * * *